(12) United States Patent
Strop et al.

(10) Patent No.: US 12,478,686 B2
(45) Date of Patent: Nov. 25, 2025

(54) ANTIBODIES MODIFIED FOR TRANSGLUTAMINASE CONJUGATION, CONJUGATES THEREOF, AND METHODS AND USES

(71) Applicant: BRISTOL-MYERS SQUIBB COMPANY, Princeton, NJ (US)

(72) Inventors: Pavel Strop, San Mateo, CA (US); Chetana Rao-Naik, Walnut Creek, CA (US); Xiaodi Deng, San Mateo, CA (US); Paul O. Sheppard, Granite Falls, WA (US); Sean Matthew WEST, Union City, CA (US); Jason Michael Hogan, Palo Alto, CA (US); Sayumi Yamazoe, Mountain View, CA (US)

(73) Assignee: BRISTOL-MYERS SQUIBB COMPANY, Princeton, NJ (US)

( * ) Notice: Subject to any disclaimer, the term of this patent is extended or adjusted under 35 U.S.C. 154(b) by 1187 days.

(21) Appl. No.: 17/297,830

(22) PCT Filed: Dec. 10, 2019

(86) PCT No.: PCT/US2019/065340
§ 371 (c)(1),
(2) Date: May 27, 2021

(87) PCT Pub. No.: WO2020/123425
PCT Pub. Date: Jun. 18, 2020

(65) Prior Publication Data
US 2022/0031860 A1 Feb. 3, 2022

Related U.S. Application Data

(60) Provisional application No. 62/778,437, filed on Dec. 12, 2018.

(51) Int. Cl.
*C07K 16/30* (2006.01)
*A61K 47/68* (2017.01)

(52) U.S. Cl.
CPC ...... *A61K 47/6803* (2017.08); *A61K 47/6851* (2017.08); *A61K 47/6889* (2017.08); *C07K 16/30* (2013.01); *C07K 2317/522* (2013.01); *C07K 2317/524* (2013.01); *C07K 2317/526* (2013.01); *C07K 2317/92* (2013.01)

(58) Field of Classification Search
None
See application file for complete search history.

(56) References Cited

U.S. PATENT DOCUMENTS

| | | | |
|---|---|---|---|
| 6,322,996 B1 | 11/2001 | Sato et al. | |
| 9,427,478 B2 | 8/2016 | Bregeon et al. | |
| 9,676,871 B2 * | 6/2017 | Strop | C07K 17/02 |
| 9,717,803 B2 | 8/2017 | Bregeon et al. | |
| 10,195,289 B2 * | 2/2019 | Farias | A61P 35/00 |
| 2005/0136491 A1 | 6/2005 | Chen et al. | |
| 2007/0184537 A1 | 8/2007 | Schibli et al. | |
| 2011/0184147 A1 * | 7/2011 | Kamiya | G01N 33/535 |
| | | | 435/68.1 |
| 2015/0284713 A1 | 10/2015 | Fischer et al. | |
| 2016/0114056 A1 | 4/2016 | Bregeon | |
| 2016/0193356 A1 | 7/2016 | Farias et al. | |
| 2018/0037921 A1 | 2/2018 | Rao-Naik et al. | |
| 2019/0099505 A1 | 4/2019 | Han et al. | |

FOREIGN PATENT DOCUMENTS

| | | | | |
|---|---|---|---|---|
| WO | WO-2012059882 A2 * | 5/2012 | | A61K 47/68 |
| WO | 2017059158 A1 | 4/2017 | | |
| WO | WO-2020112588 A1 * | 6/2020 | | A61K 47/6811 |

OTHER PUBLICATIONS

Strop et al., Chem Biol. Feb. 21, 2013;20(2):161-7. doi: 10.1016/j.chembiol.2013.01.010. PMID: 23438745.*
Ando et al; Agri. Biol. Chem; _"Purification and Characteristics of a Novel Transglutaminase Derived From Microorganisms"; vol. 53; pp. 2613-2617; 1989.
Chantel Ginestoux_IMGT Scientific Chart_May 17, 2001.
Dennler et al.; Bioconjug. Chem; "Transglutaminase-Based Chemo-Enzymatic Conjugation Approach Yields Homogeneous Antibody-Drug Conjugates"; vol. 25; pp. 569-578; 2014.
Fontana, et al.; Advanced Drug Delivery Reviews; "Site-specific modification and PEGylation of pharmaceutical proteins mediated by transglutaminase"; vol. 60; pp. 13-28; 2008.
Gerber et al.; Nat. Prod. Rep.; "The antibody-drug conjugate: an enabling modality for natural product-based cancer therapeutics"; vol. 30; pp. 625-639; 2013.
Hayura Sato; Advanced Drug Discovery; "Enzymatic procedure for site-specific pegylation of proteins"; vol. 54; pp. 487-504; 2002.
Innate Pharma; Presentation at ADS Summit, ; "A New Site Specific Antibody Conjugation Using Bacterial Transglutaminase"; pp. 01-29; Oct. 13, 2013.
Jeger, et al.; Agew Chemistry Intl.; "Site-Specific and Stoichiometric Modification of Antibodies by Bacterial Transglutaminase"; vol. 49; pp. 9995-9997; 2010.
Lin et al.; JACS; "Transglutaminase-Catalyzed Site-Specific Conjugation of Small-Molecule Probes to Proteins in Vitro and on the Surface of Living Cells"; vol. 128; pp. 4542-4543; Mar. 16, 2006.
Mero et al.; Bioconjugate Chemistry; "Transflutaminase-Mediated PEGylation of Proteins: Direct Indentification of the Sites of Protein Modification by Mass Spectrometry using a Novel Monodisperse PEG"; vol. 20; pp. 384-389; 2009.
Mindt et al.; Bioconjugate Chemistry; "Modification of Different IgG1 Antibodies via Glutamine and Lysine using Bacterial and Human Tissue Transglutaminase"; vol. 19; pp. 271-278; 2008.

(Continued)

*Primary Examiner* — Michael Szperka
(74) *Attorney, Agent, or Firm* — Gregory R. Bellomy; Yuan Chao

(57) ABSTRACT

Antibodies are modified by replacing amino acids in the heavy chain CH1, CH2, or CH3 or light chain constant region with selected replacement glutamine-containing sequences to render them amenable to conjugation by the enzyme transglutaminase.

5 Claims, 15 Drawing Sheets

Specification includes a Sequence Listing.

(56) References Cited

OTHER PUBLICATIONS

Ohtsuka et al.; Biosci. Biotechnol. Biochem.; "Comparision of Substrate Specificities of Transglutaminases Using Synthetic Peptides as Acyl Donors"; vol. 64; pp. 2608-2613; 2000.
PCT ISR; ISA EP; Jul. 8, 2020.
Strop, et al.; Chemistry & Biology; "Location Matters: Site of Conjugation Modulates Stability and Pharmacokinetics of Antibody Drug Conjugates"; vol. 20; pp. 161-167; 2013.
Sugimura, et al.; Journal of Biotechnology; "Novel site-specific immobilization of a functional protein using a preferred substrate sequence for transglutaminase 2"; vol. 131; pp. 121-127; 2007.

\* cited by examiner

Human IgG1 CH1 Loops

Human IgG1 CH2 Loops

Human IgG1 CH3 Loops

FIG. 4A

Human IgG1 Heavy Chain Constant Region

Alignment between SEQ ID NO:1 and EU Numbering

```
                                          ~~~~~~~~~~~
Ala Ser Thr Lys Gly Pro Ser Val Phe Pro Leu Ala Pro SER SER LYS
1           5               10                  15              SEQ ID NO:1
118                 125             130                         EU Number CH1 Loop 1~~~~~~~~~
SER THR SER GLY GLY Thr Ala Ala Leu Gly Cys Leu Val Lys Asp Tyr
            20              25                  30              SEQ ID NO:1
    135             140             145                         EU Number ~~~~~~~CH1 Loop 2~~~~~~~~~~
Phe Pro Glu Pro Val Thr Val Ser Trp ASN SER GLY ALA LEU THR SER
            35              40              45                  SEQ ID NO:1
150                 155             160             165         EU Number ~~~~CH1 Loop 3~~~~~
Gly Val His Thr Phe Pro Ala Val Leu GLN SER SER GLY LEU Tyr Ser
            50              55              60                  SEQ ID NO:1
                170             175             180             EU Number ~~~~~~~~~~~CH1 Loop 4~~~~~~~~~~~~~~~
Leu Ser Ser Val Val Thr Val PRO SER SER SER LEU GLY THR GLN THR
65              70              75              80              SEQ ID NO:1
        185             190             195                     EU Number ~~~~CH1 Loop 5~~~~~
Tyr Ile Cys Asn Val Asn HIS LYS PRO SER ASN Thr Lys Val Asp Lys
            85              90              95                  SEQ ID NO:1
    200             205             210                         EU Number Arg Val Glu Pro Lys Ser Cys Asp Lys Thr His Thr Cys Pro Pro Cys
            100             105             110                 SEQ ID NO:1
    215             220             225                         EU Number
```

Bold ALL CAPS = Loop-associated amino acid

FIG. 4B

```
                                                                   ~~~
Pro Ala Pro Glu Leu Leu Gly Gly Pro Ser Val Phe Leu Phe Pro PRO
        115             120             125                        SEQ ID NO:1
230             235             240             245                EU Number ~~~~~~~~~~~~~~~~CH2 LOOP 1~~~~~~~~~~~~~~~~~
LYS PRO LYS ASP THR LEU MET ILE SER ARG THR Pro Glu Val Thr Cys
        130             135             140                        SEQ ID NO:1
                250             255             260                EU Number ~~~~~~~~~~~CH2 Loop 2~~~~~~~~~~~~~~~
Val Val Val Asp VAL SER HIS GLU ASP PRO GLU VAL LYS Phe Asn Trp
145             150             155             160               SEQ ID NO:1
                265             270             275                EU Number ~~~~~~~~~CH2 Loop 3~~~~~~~~~~
Tyr VAL ASP GLY VAL GLU VAL HIS Asn Ala Lys Thr Lys Pro Arg Glu
        165             170             175                        SEQ ID NO:1
        280             285             290                        EU Number ~~~~~~CH2 Loop 4~~~~~~~                                 ~~~~~~~
Glu GLN TYR ASN SER THR TYR Arg Val Val Ser Val Leu Thr VAL LEU
        180             185             190                        SEQ ID NO:1
        295             300             305                        EU Number ~~~~~~~~~CH2 Loop 5~~~~~~~~~~~~~~~~~~                           ~~~~~~~
HIS GLN ASP TRP LEU ASN GLY LYS GLU Tyr Lys Cys Lys Val SER ASN
        195             200             205                        SEQ ID NO:1
310             315             320             325                EU Number ~~~CH2 Loop 6~~~~~~~~~~~
LYS ALA LEU PRO ALA PRO Ile Glu Lys Thr Ile Ser Lys Ala Lys Gly
        210             215             220                        SEQ ID NO:1
                330             335             340                EU Number ~~~~~~~~CH3 Loop 1~~~~~~
Gln Pro Arg Glu Pro Gln Val Tyr Thr Leu PRO PRO SER ARG GLU GLU
225             230             235             240                SEQ ID NO:1
        345             350             355                        EU Number
```

Bold ALL CAPS = Loop-associated amino acid

FIG. 4C

```
~~~CH3 Loop 1~~~~~~
MET THR LYS ASN GLN Val Ser Leu Thr Cys Leu Val Lys Gly Phe Tyr
            245             250             255            SEQ ID NO:1
        360         365             370                    EU Number ~~~CH3 Loop 2~~
Pro Ser Asp Ile Ala Val Glu Trp Glu SER ASN GLY GLN Pro Glu Asn
            260             265             270            SEQ ID NO:1
    375             380             385                    EU Number ~~~~~~~~CH3 Loop 3~~~~~~~~~
Asn Tyr Lys Thr Thr Pro Pro VAL LEU ASP SER ASP GLY SER Phe Phe
        275             280             285                SEQ ID NO:1
390             395             400             405        EU Number ~~~~~~~~~~CH3 Loop 4~~~~~~~~~~~~
Leu Tyr Ser Lys Leu Thr Val ASP LYS SER ARG TRP GLN GLN GLY Asn
    290             295             300                    SEQ ID NO:1
            410             415             420            EU Number ~~~~~~~~~~CH3 Loop 5~~~~~~~~~
Val Phe Ser Cys Ser Val Met HIS GLU ALA LEU HIS ASN HIS Tyr Thr
305             310             315             320        SEQ ID NO:1
        425             430             435                EU Number Gln Lys Ser Leu Ser Leu Ser Pro Gly Lys
            325             330     SEQ ID NO:1
        440         445             EU Number
```

Bold ALL CAPS = Loop-associated amino acid

FIG. 5A

Human IgG1, IgG2, IgG3 and IgG4

Alignment of Loops

```
                 **A*                            *B*                **C
hIgG1    ASTKGPSVFPLAPSSKSTSGGTAALGCLVKDYFPEPVTVSWNSGALTSGVHTFPAVLQSS
hIgG2    ASTKGPSVFPLAPCSRSTSESTAALGCLVKDYFPEPVTVSWNSGALTSGVHTFPAVLQSS
hIgG3    ASTKGPSVFPLAPCSRSTSGGTAALGCLVKDYFPEPVTVSWNSGALTSGVHTFPAVLQSS
hIgG4    ASTKGPSVFPLAPCSRSTSESTAALGCLVKDYFPEPVTVSWNSGALTSGVHTFPAVLQSS

D      E**
hIgG1    GLYSLSSVVTVPSSSLGTQTYICNVNHKPSNTKVDKRV--------------------
hIgG2    GLYSLSSVVTVPSSNFGTQTYTCNVDHKPSNTKVDKTV--------------------
hIgG3    GLYSLSSVVTVPSSSLGTQTYTCNVNHKPSNTKVDKRVELKTPLGDTTHTCPRCPEPKSC
hIgG4    GLYSLSSVVTVPSSSLGTKTYTCNVDHKPSNTKVDKRV--------------------

*****F
hIgG1    ----------------------EPKSCDKTHTCPPCPAPELLGGPSVFLFPPKPKDT
hIgG2    ----------------------ERKCC---VECPPCPAPP-VAGPSVFLFPPKPKDT
hIgG3    DTPPPCPRCPEPKSCDTPPPCPRCPEPKSCDTPPPCPRCPAPELLGGPSVFLFPPKPKDT
hIgG4    ----------------------ESKYG---PPCPSCPAPEFLGGPSVFLFPPKPKDT

****     G   *H*        *I         *
hIgG1    LMISRTPEVTCVVVDVSHEDPEVKFNWYVDGVEVHNAKTKPREEQYNSTYRVVSVLTVLH
hIgG2    LMISRTPEVTCVVVDVSHEDPEVQFNWYVDGVEVHNAKTKPREEQFNSTFRVVSVLTVVH
hIgG3    LMISRTPEVTCVVVDVSHEDPEVQFKWYVDGVEVHNAKTKPREEQYNSTFRVVSVLTVLH
hIgG4    LMISRTPEVTCVVVDVSQEDPEVQFNWYVDGVEVHNAKTKPREEQFNSTYRVVSVLTVLH
```

KEY:
A = CH1 Loop 1    B = CH1 Loop 2    C = CH1 Loop 3    D = CH1 Loop 4
E = CH1 Loop 5    F = CH2 Loop 1    G = CH2 Loop 2    H = CH2 Loop 3
I = CH2 Loop 4    J = CH2 Loop 5    K = CH2 Loop 6    L = CH3 Loop 1
M = CH3 Loop 2    N = CH3 Loop 3    O = CH3 Loop 4    P = CH3 Loop 5

FIG. 5B

```
            J*        K*                          **L***
hIgG1    QDWLNGKEYKCKVSNKALPAPIEKTISKAKGQPREPQVYTLPPSREEMTKNQVSLTCLVK
hIgG2    QDWLNGKEYKCKVSNKGLPAPIEKTISKTKGQPREPQVYTLPPSREEMTKNQVSLTCLVK
hIgG3    QDWLNGKEYKCKVSNKALPAPIEKTISKTKGQPREPQVYTLPPSREEMTKNQVSLTCLVK
hIgG4    QDWLNGKEYKCKVSNKGLPSSIEKTISKAKGQPREPQVYTLPPSQEEMTKNQVSLTCLVK

**M*           *N*          *O*            **
hIgG1    GFYPSDIAVEWESNGQPENNYKTTPPVLDSDGSFFLYSKLTVDKSRWQQGNVFSCSVMHE
hIgG2    GFYPSDISVEWESNGQPENNYKTTPPMLDSDGSFFLYSKLTVDKSRWQQGNVFSCSVMHE
hIgG3    GFYPSDIAVEWESSGQPENNYNTTPPMLDSDGSFFLYSKLTVDKSRWQQGNIFSCSVMHE
hIgG4    GFYPSDIAVEWESNGQPENNYKTTPPVLDSDGSFFLYSRLTVDKSRWQEGNVFSCSVMHE

*P***
hIgG1    ALHNHYTQKSLSLSPGK
hIgG2    ALHNHYTQKSLSLSPGK
hIgG3    ALHNRFTQKSLSLSPGK
hIgG4    ALHNHYTQKSLSLSLGK
```

KEY:
A = CH1 Loop 1    B = CH1 Loop 2    C = CH1 Loop 3    D = CH1 Loop 4
E = CH1 Loop 5    F = CH2 Loop 1    G = CH2 Loop 2    H = CH2 Loop 3
I = CH2 Loop 4    J = CH2 Loop 5    K = CH2 Loop 6    L = CH3 Loop 1
M = CH3 Loop 2    N = CH3 Loop 3    O = CH3 Loop 4    P = CH3 Loop 5

Human Kappa-Lambda Chain Loop Alignments

FIG. 7

Human Kappa Light Chain Constant Region

Alignment between SEQ ID NO:5 and EU Numbering

```
                                                ~~~~~~~~~~~
Arg Thr Val Ala Ala Pro Ser Val Phe Ile Phe Pro Pro SER ASP GLU
1           5               10              15                     SEQ ID NO:5
108             115             120                                 EU Number ~~~CK Loop 1~~~~~~~~
GLN LEU LYS SER GLY Thr Ala Ser Val Val Cys Leu Leu Asn Asn Phe
            20              25              30                     SEQ ID NO:5
      125             130             135                           EU Number ~~~~~~~~CK Loop 2~~~
Tyr Pro Arg Glu Ala Lys Val Gln Trp Lys Val ASP ASN ALA LEU GLN
            35              40              45                     SEQ ID NO:5
      140             145             150             155           EU Number ~~~~~~~~~~~                     ~~~~~~~~~~~CK Loop 3~~~~~~~
SER GLY ASN Ser Gln Glu Ser Val Thr GLU GLN ASP SER LYS ASP SER
            50              55              60                     SEQ ID NO:5
      160             165             170                           EU Number ~~~                             ~~~~~~~~~~~CK Loop 4~~~
THR Tyr Ser Leu Ser Ser Thr Leu Thr Leu SER LYS ALA ASP TYR GLU
65              70              75              80                 SEQ ID NO:5
      175             180             185                           EU Number ~~~~~~~~~~~                     ~~~~~~~~~~~CK Loop 5~~~~~~~
LYS HIS LYS Val Tyr Ala Cys Glu Val THR HIS GLN GLY LEU SER SER
            85              90              95                     SEQ ID NO:5
      190             195             200                           EU Number Pro Val Thr Lys Ser Phe Asn Arg Gly Glu Cys
            100             105             SEQ ID NO:5
      205             210             214   EU Number
```

Bold ALL CAPS = Loop-associated amino acid

FIG. 8

Human Kappa and Lambda Light Chains

Alignment of Loops

```
                ****A***                              ****B****          *
hKappa     -RTVAAPSVFIFPPSDEQLKSGTASVVCLLNNFYPREAKVQWKVDNA-LQSGNSQESVTE
hLambda    GQPKANPTVTLFPPSSEELQANKATLVCLISDFYPGAVTVAWKADGSPVKAG--VETTKP

*C*         **D        E*
hKappa     QDSKDSTYSLSSTLTLSKADYEKHKVYACEVTHQGLSSPVTKSFNRGEC-
hLambda    SKQSNNKYAASSYLSLTPEQWKSHRSYSCQVTHEG--STVEKTVAPTECS
```

KEY:
A = Loop 1  B = Loop 2  C = Loop 3  D = Loop 4
E = Loop 5

Preparation of Antibody Conjugate Using Transglutaminase (BTG)

ANTIBODIES MODIFIED FOR TRANSGLUTAMINASE CONJUGATION, CONJUGATES THEREOF, AND METHODS AND USES

CROSS-REFERENCE TO RELATED APPLICATIONS

This application claims the benefit under 35 U.S.C. § 119(e) of U.S. Provisional Application Ser. No. 62/778,437, filed Dec. 12, 2018; the disclosure of which is incorporated herein by reference.

SEQUENCE LISTING

Incorporated herein by reference in its entirety is a Sequence Listing named "181031_SEQT_13143WOPCT_YC.txt," comprising SEQ ID NO:1 through SEQ ID NO:103, which include nucleic acid and/or amino acid sequences disclosed herein. The Sequence Listing has been submitted herewith in ASCII text format via EFS-Web, and thus constitutes both the paper and computer readable form thereof. The Sequence Listing was first created using PatentIn 3.5 on Oct. 31, 2018, and is approximately 39 KB in size.

BACKGROUND OF THE DISCLOSURE

This disclosure relates to modified antibodies conjugatable by the enzyme transglutaminase and conjugates made from such antibodies.

A type of biologic that has attracted intense current interest is one in which an antibody is covalently linked to a partner molecule ("antibody-drug conjugate," "ADC," "conjugate" or "immunoconjugate"). Thus, a conjugate comprises three components: (1) the antibody, (2) the partner molecule, and (3) a linker covalently joining the first two components.

The partner molecule can be a therapeutic agent such as an anti-cancer drug, an adjuvant, another protein, or a radioisotope. The antibody is one whose antigen is expressed by a target cell or tissue. The antibody, through its binding to the antigen, serves to deliver the conjugate to the target. Once there, cleavage of the covalent link or degradation of the antibody results in the release of the therapeutic agent at the target location. Conversely, while the conjugate is circulating in the blood system, the therapeutic agent is held inactive because of its covalent linkage to the antibody, reducing the risk of side effects. For a review on conjugates in anti-cancer treatment, see Gerber et al. 2013.

Alternatively to a therapeutic agent, the partner molecule can be an assay agent for diagnosing, locating a disease site, or monitoring of a medical condition. In such instance, the assay agent can be, for example, biotin, a fluorescent label, a radioactive label, or a deuterated polymer. Smith et al. 2019 discloses a conjugate comprising a deuterated polymer for MRI imaging. In such instance, cleavage of the linker at the target site is not necessary and may in fact be undesirable. For such use, the linker can be designed to be of the non-cleavable type.

A key step in the preparation of a conjugate is the covalent joining step, also referred to as the conjugation step. Many methods having been disclosed for effecting conjugation. One that has attracted substantial recent interest is conjugation mediated by the enzyme transglutaminase (EC 2.3.2.13).

Many transglutaminase variants are known, either produced naturally by different organisms or made by bioengineering. One commonly used in the food industry for texturing proteins is *Streptomyces mobaraensis* transglutaminase, obtained by fermentation or recombinant expression. Herein, the term "transglutaminase" is used generically unless a specific type or source is indicated.

Transglutaminase forms an amide bond between the carboxamide side chain of a glutamine (the amine acceptor, or, reciprocally, the acyl donor) and the ε-amino group of a lysine (the amine donor, or, reciprocally, the acyl acceptor). Specificity-wise, transglutaminase is selective regarding the glutamine residue, requiring it to be located in a flexible part of a protein loop and flanked by certain amino acids, but is promiscuous regarding the lysine residue, for example readily accepting the amino group of an alkyleneamino compound as a lysine ε-amino surrogate. See Fontana et al. 2008.

In a typical transglutaminase-mediated conjugation, the glutamine residue is located on the antibody, while the amino group is located on the linker-partner molecule moiety, as shown below:

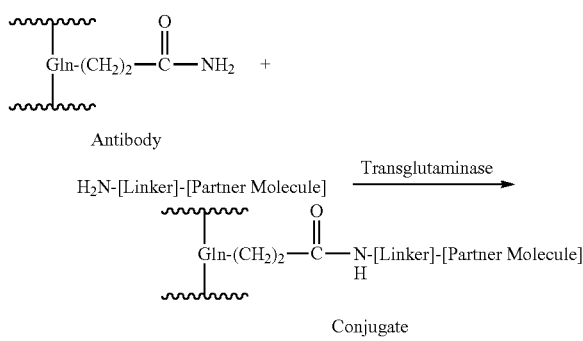

The location of a glutamine residue on a polypeptide chain has a large effect on its availability as an amine acceptor. Normally, none of the glutamine residues on an antibody are available and some modification of the antibody is necessary to make them available. Typically, an antibody is glycosylated at asparagine 297 (N297) of the heavy chain (N-linked glycosylation). Jeger et al. 2010 discovered that deglycosylation of the antibody, either by eliminating the glycosylation site through an N297A substitution or post-translation enzymatic deglycosylation, renders nearby glutamine 295 (Q295) available for transamidation by *S. mobaraensis* transglutaminase. They further showed that an N297Q substitution not only eliminates glycosylation, but also introduces a second glutamine residue (at position 297) that too is an amine acceptor. Thus, simple deglycosylation generates two transglutaminase reactive glutamine residues per antibody (one per heavy chain, at Q295), while an antibody with an N297Q substitution has four such glutamine residues (two per heavy chain, at positions Q295 and Q297).

In addition to the N297A and N297Q substitutions disclosed by Jeger et al. 2010, there have been other disclosures on modifying an antibody or another protein to make it a substrate for transglutaminase.

(a) Strop et al. 2017 and Farias et al. 2016 disclose antibody Fc regions engineered with glutamine-containing tags such as LLQGG, LSLSQG, GGGLLQGG, GLLQG, etc., where the glutamine in the tag can act as an amine acceptor and be positioned at various places of an antibody heavy or light chain, including the carboxy termini thereof.

(b) Chen et al. 2005 discloses the modification of a protein with the tag QSKVX, where X is L or I, which protein can then be conjugated with transglutaminase.

(c) Fischer et al. 2015 discloses the incorporation into an antibody fragment lacking an Fc domain a glutamine (Q) containing tag of the formula

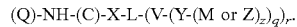

$(Q)\text{-}NH\text{-}(C)\text{-}X\text{-}L\text{-}(V\text{-}(Y\text{-}(M \text{ or } Z)_z)_q)_r.$ (d) Rao-Naik et al. 2018 discloses appending glutamine-containing heavy chain C-terminal extensions to an antibody to render it transglutaminase-reactive.

In an approach complementary to modifying an antibody to make it transglutaminase-reactive, Rao-Naik et al. 2017 discloses modifying transglutaminase to make it capable of conjugating to a wild-type antibody.

There also have been studies on the substrate specificity of transglutaminase using small peptide-containing molecules: Ando et al. 1989, Kamiya et al. 2011, Ohtsuka et al. 2000.

Other disclosures relating to conjugation of antibodies or other proteins using transglutaminase are: Bregeon 2016, Bregeon et al. 2016, Bregeon et al. 2017, Dennler et al. 2014, Innate Pharma 2013, Lin et al. 2006, Mero et al. 2009, Mindt et al. 2008, Sato 2002, Sato et al. 2001, Schibli et al. 2007, and Sugimura et al. 2007.

It is also known to attach cysteine-containing terminal extensions to an antibody for the purpose of effecting conjugation via Michael addition to a maleimide group. Liu et al. 2014 disclose attaching such extensions to the C-terminus of a heavy chain. Babcook et al. 2017 disclose attaching such extensions to the C-terminus of a light chain.

Full citations for the documents cited herein by first author or inventor and year are listed at the end of this specification.

BRIEF SUMMARY OF THE DISCLOSURE

We have discovered that loops in the constant regions of heavy and light chains of an antibody are favorable locations for modification to make the antibody amenable to conjugation (transamidation) by transglutaminase.

Accordingly, in one embodiment, there is provided an IgG full length antibody having a replacement sequence selected from the group consisting of:

(i) replacement of the amino acids at EU 131 through 135 of a heavy chain with the amino acids of SEQ ID NO:7, SEQ ID NO:8, and SEQ ID NO: 9 or SEQ ID NO:10;

(ii) replacement of the amino acids at EU 160 through 164 of a heavy chain with the amino acids of SEQ ID NO:11, SEQ ID NO: 12, SEQ ID NO:13, SEQ ID NO:14, SEQ ID NO:16, or SEQ ID NO:17;

(iii) replacement of the amino acids at EU 175 through 177 of a heavy chain with the amino acids of SEQ ID NO:18, SEQ ID NO:19, or NO:20;

(iv) replacement of the amino acids at EU 190 through 196 of a heavy chain with the amino acids of SEQ ID NO:22, SEQ ID NO:23, or SEQ ID NO:24;

(v) replacement of the amino acids at EU 264 through 269 of a heavy chain with the amino acids of SEQ ID NO:25, SEQ ID NO:26, SEQ ID NO:27 or SEQ ID NO:28;

(vi) replacement of the amino acids at EU 280 through 284 of a heavy chain with the amino acids of SEQ ID NO:29, SEQ ID NO:30, or SEQ ID NO:31;

(vii) replacement of the amino acids at EU 292 through 297 of a heavy chain with the amino acids of SEQ ID NO:33, SEQ ID NO:34, SEQ ID NO:35, SEQ Id NO:36, SEQ ID NO:37, SEQ ID NO: 38, SEQ ID NO:39, SEQ ID NO:40, SEQ ID NO:41, SEQ ID NO:42, SEQ ID NO:43, SEQ ID NO:44, SEQ ID NO:45, SEQ ID NO:47, SEQ ID NO:100, SEQ ID NO:101, SEQ ID NO:102, or SEQ ID NO:103;

(viii) replacement of the amino acids at EU 314 through 319 of a heavy chain with the amino acids of SEQ ID NO:48, SEQ ID NO:49 or SEQ ID NO:50;

(ix) replacement of the amino acids at EU 330 through 331 of a heavy chain with the amino acids of SEQ ID NO:51, SEQ ID NO:52, or SEQ ID NO:53;

(x) replacement of the amino acids at EU 358 through 362 of a heavy chain with the amino acids of SEQ ID NO:54 or SEQ ID NO:55;

(xi) replacement of the amino acids at EU 384 through 402 of a heavy chain with the amino acids of SEQ ID NO:56, SEQ ID NO:57, SEQ ID NO:58, SEQ ID NO:59, SEQ ID NO:60, SEQ ID NO:61, SEQ ID NO:62, SEQ ID NO:63 or SEQ ID NO:64;

(xii) replacement of the amino acids at EU 414 through 419 of a heavy chain with the amino acids of SEQ ID NO:65, SEQ ID NO:66, SEQ ID NO:67, SEQ ID NO:68, or SEQ ID NO:69;

(xiii) replacement of the amino acids at EU 122 through 126 of a light chain with the amino acids of SEQ ID NO:70, SEQ ID NO:71, or SEQ ID NO:72;

(xiv) replacement of the amino acids at EU 152 through 155 of a light chain with the amino acids of SEQ ID NO:73, SEQ ID NO:74, or SEQ ID NO:75;

(xv) replacement of the amino acids at EU 167 through 170 of a light chain with the amino acids of SEQ ID NO:76, SEQ ID NO: 77, SEQ ID NO:78, SEQ ID NO: 79, SEQ ID NO:81, or SEQ ID NO:82;

(xvi) replacement of the amino acids at EU 182 through 190 of a light chain with the amino acids of SEQ ID NO:83, SEQ ID NO:84, SEQ ID NO:85, SEQ ID NO:86, or SEQ ID NO:87; and (xvii) replacement of the amino acids at EU 199 through 204 of a light chain with the amino acids of SEQ ID NO:89, SEQ ID NO:90, SEQ ID NO:91, SEQ ID NO:92, SEQ ID NO:93, SEQ ID NO:94, SEQ ID NO:95, or SEQ ID NO:96.

In another embodiment, there is provided an IgG full length antibody having a replacement sequence selected from the group consisting of:

(I) replacement of the amino acids at EU 131 through 135 of a heavy chain with the amino acids of SEQ ID NO:9 or SEQ ID NO:10;

(II) replacement of the amino acids at EU 175 through 177 of a heavy chain with the amino acids of SEQ ID NO:18;

(III) replacement of the amino acids at EU 190 through 196 of a heavy chain with the amino acids of SEQ ID NO:22;

(IV) replacement of the amino acids at EU 264 through 269 of a heavy chain with the amino acids of SEQ ID NO:27 or SEQ ID NO:28;

(V) replacement of the amino acids at EU 292 through 297 of a heavy chain with the amino acids of SEQ ID NO:34, SEQ ID NO:35, SEQ ID NO:37, SEQ ID NO:38, SEQ ID NO:39, SEQ ID NO:40, SEQ ID NO:41, SEQ ID NO:42, SEQ ID NO:43, SEQ ID NO:44, SEQ ID NO:45, SEQ ID NO:100, SEQ ID NO:101, SEQ ID NO:102, or SEQ ID NO:103;

(VI) replacement of the amino acids at EU 330 through 331 of a heavy chain with the amino acids of SEQ ID NO: 51, SEQ ID NO:52 or SEQ ID NO:53;
(VII) replacement of the amino acids at EU 384 through 402 of a heavy chain with the amino acids of SEQ ID NO:57, SEQ ID NO:58, or SEQ ID NO:63;
(VIII) replacement of the amino acids at EU 414 through 419 of a heavy chain with the amino acids of SEQ ID NO:66 or SEQ ID NO:68;
(IX) replacement of the amino acids at EU 152 through 155 of a light chain with the amino acids of SEQ ID NO:73 or SEQ ID NO:75;
(X) replacement of the amino acids at EU 167 through 170 of a light chain with the amino acids of SEQ ID NO: 78 or SEQ ID NO:82; and
(XI) replacement of the amino acids at EU 199 through 204 of a light chain with the amino acids of SEQ ID NO: 92, SEQ ID NO:93 or SEQ ID NO:94.

In another aspect, this specification provides a conjugate of the formula (IV)

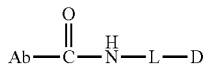

(IV)

wherein
Ab is a full length antibody having a replacement sequence according to subparagraph (i)-(xvii) above;
L is a linker moiety bonded to Ab via the amide bond

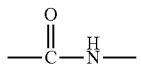

to a glutamine in the replacement sequence; and
D is selected from the group consisting of a protein, a radioisotope, an assay agent, and a therapeutic agent.

In another aspect, this specification provides a method of making an antibody conjugate, comprising the steps of
(a) mixing a full length antibody having a replacement sequence according to subparagraph (i)-(xvii) above with an amine donor compound comprising a primary amine and a moiety selected from the group consisting of a protein, a radioisotope, an assay agent, and a therapeutic agent, in the presence of a transglutaminase; and
(b) allowing the transglutaminase to catalyze the formation of an amide bond between the side chain carboxamide of a glutamine of the replacement sequence and the primary amine of the amine donor compound, thereby making the antibody conjugate.

In another aspect, this specification provides a method of making an antibody conjugate, comprising the steps of
(a) mixing a full length antibody having a replacement sequence according to subparagraph (i)-(xvii) above with a first compound, which first compound is an amine donor compound having a primary amine and a first reactive functional group, in the presence of a transglutaminase;
(b) allowing the transglutaminase to catalyze the formation of an amide bond between the side chain carboxamide of a glutamine of the replacement sequence and the primary amine of the first compound, to make an adduct of the antibody and the first compound;
(c) contacting the adduct with a second compound having a second reactive functional group and a moiety selected from the group consisting of a protein, a radioisotope, an assay agent, and a therapeutic agent; the second reactive functional group being capable of reacting with the first reactive functional group to form a covalent bond therebetween; and
(d) allowing the first and second reactive functional groups to react and form a covalent bond therebetween, thereby making the antibody conjugate.

Where moiety (in the first compound or second compound, as the case may be) is a protein, the resultant conjugate is a fusion protein. Where the moiety is a radioisotope, the resultant conjugate can be used for radiation therapy or radioimaging. The moiety can be an assay agent such as a fluorescent label, a deuterated polymer, or a ligand like biotin, in which case the conjugate can be used for diagnosing a medical condition, monitoring of treatment, or analytical applications. Preferably, the moiety is a therapeutic agent (in which case the product is also referred to as an antibody-drug conjugate or ADC), which can be used in medical treatments, especially the treatment of cancer.

BRIEF DESCRIPTION OF THE DRAWING(S)

FIG. 4A, FIG. 4B, and FIG. 4C show, in combination, the correlation between the sequential amino acid numbering of SEQ ID NO:1 and the EU numbering for human IgG1 antibody heavy chain constant region, plus the loop-associated amino acids therein.

FIG. 5A and FIG. 5B show, in combination, the alignment of the loop associated amino acids for human IgG1 (SEQ ID NO:1), IgG2 (SEQ ID NO:2), IgG3 (SEQ ID NO:3), and IgG4 (SEQ ID NO:4) constant regions.

Figure 6:
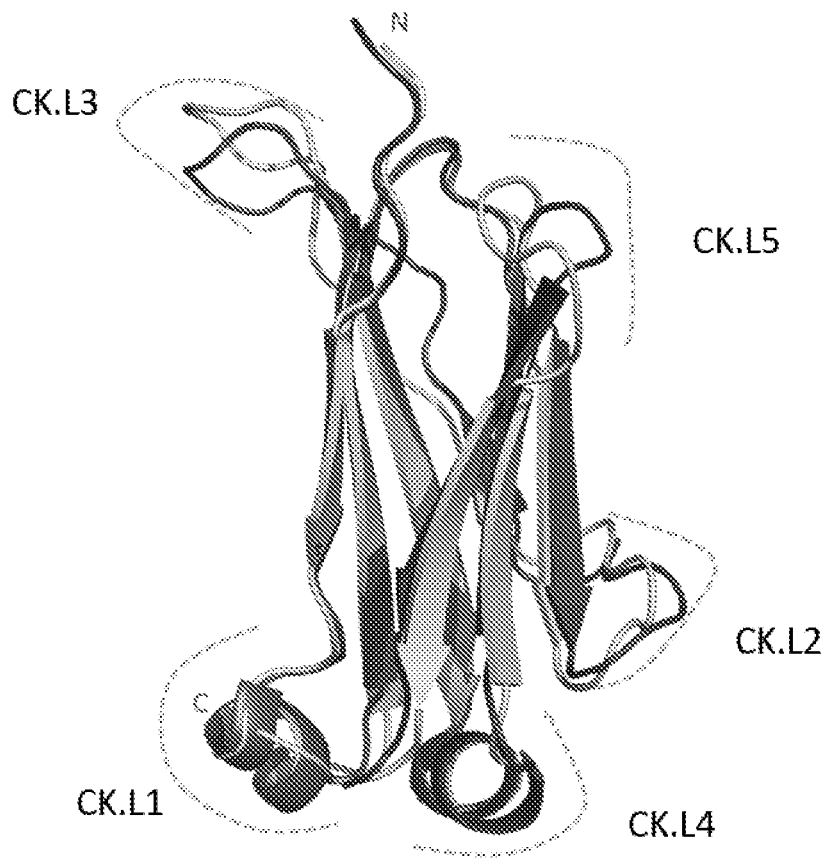

FIG. 6 is a schematic drawing overlaying the human kappa and lambda light chain constant regions, showing the alignment of the loops where modifications can be made as disclosed herein.

FIG. 7 shows the correlation between the sequential amino acid numbering of SEQ ID NO:5 and the EU numbering for human antibody kappa light chain constant region, plus the loop-associated amino acids therein.

FIG. 8 shows the alignment between the loop associated amino acids of human kappa (SEQ ID NO:5) and lambda (SEQ ID NO:6) constant regions.

Figure 9:
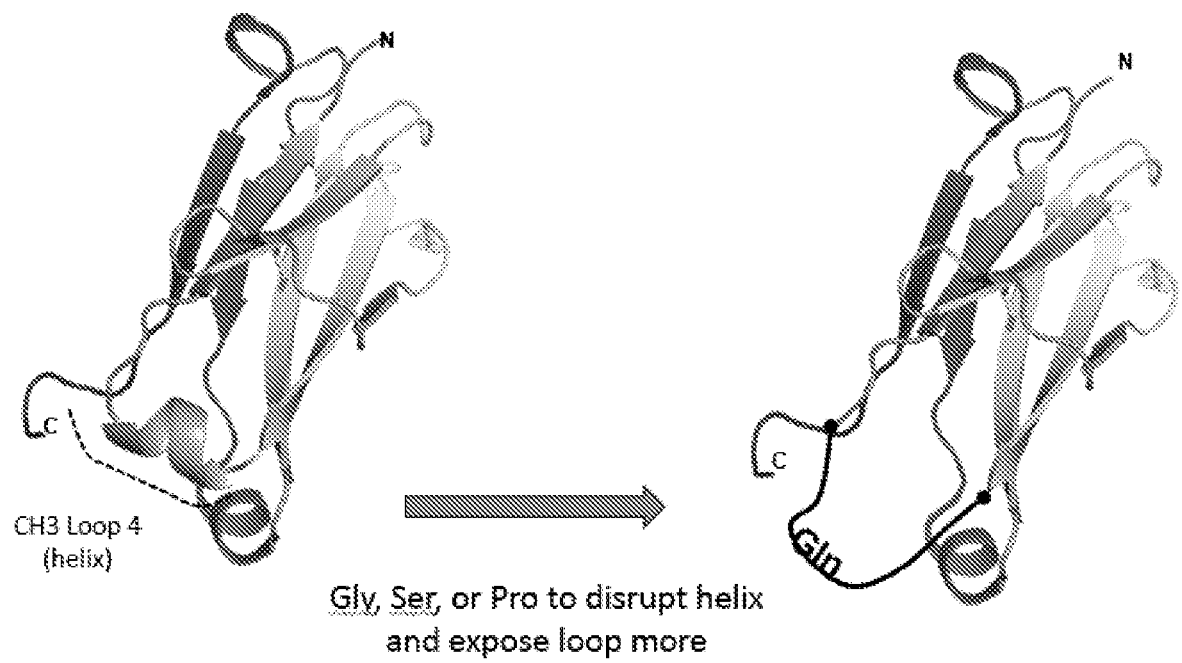

FIG. 9 is a schematic drawing illustrating how a loop can be modified so that it contains a transglutaminase reactive glutamine.

Figure 10:
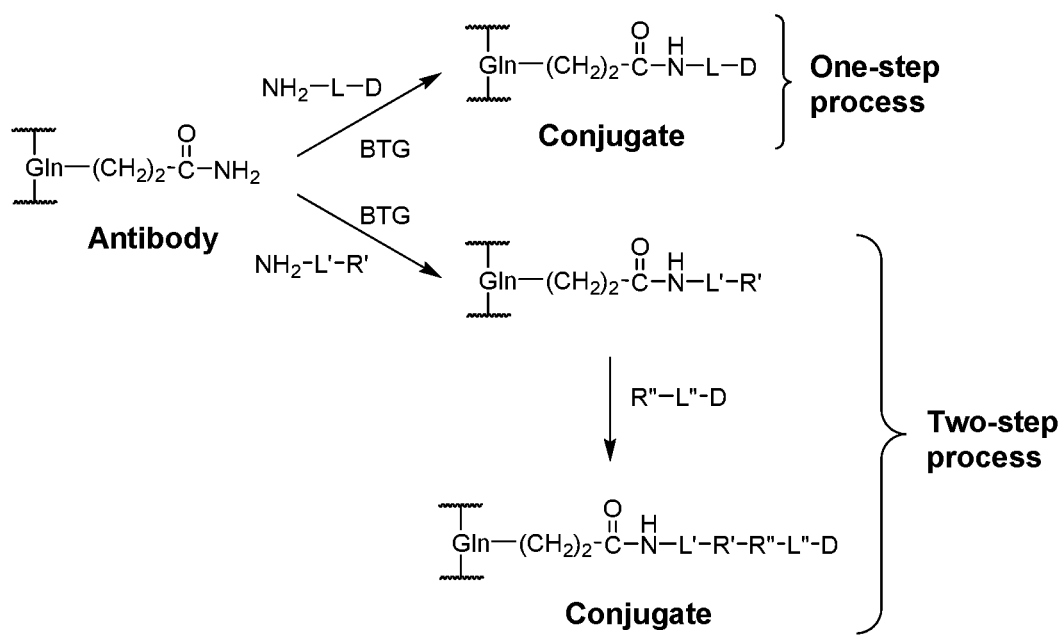

FIG. 10 compares schematically the one- and two-step methods for making conjugates using transglutaminase.

Figure 11A:
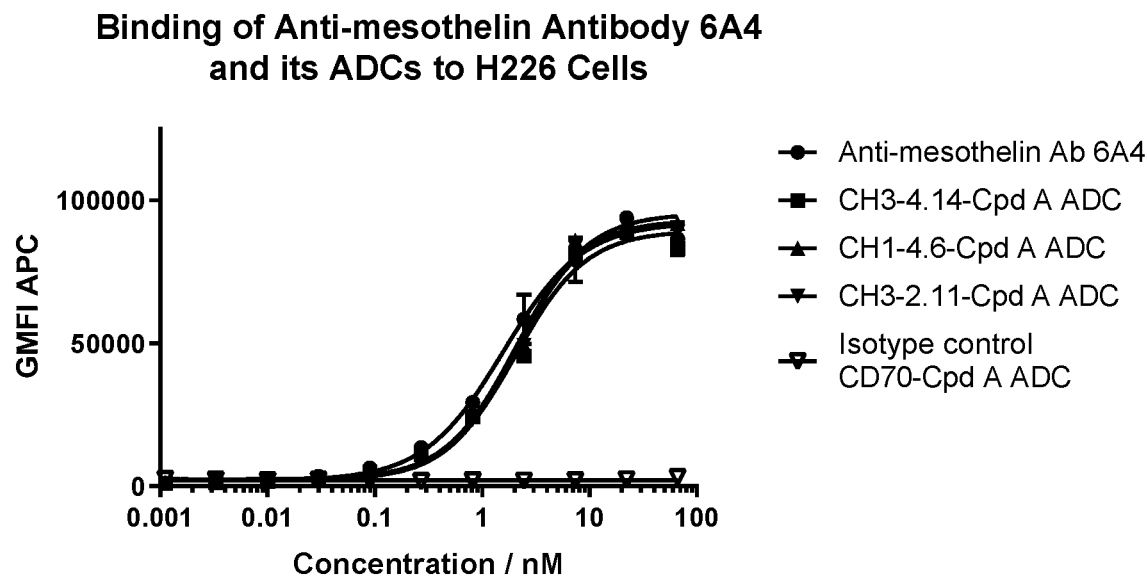
Figure 11B:
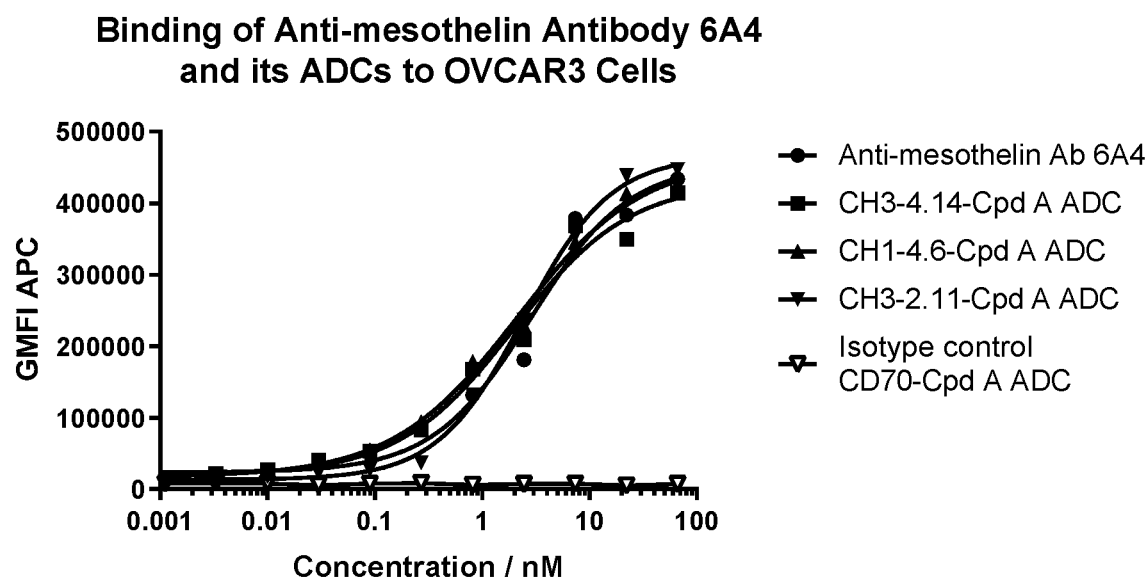
Figure 11C:
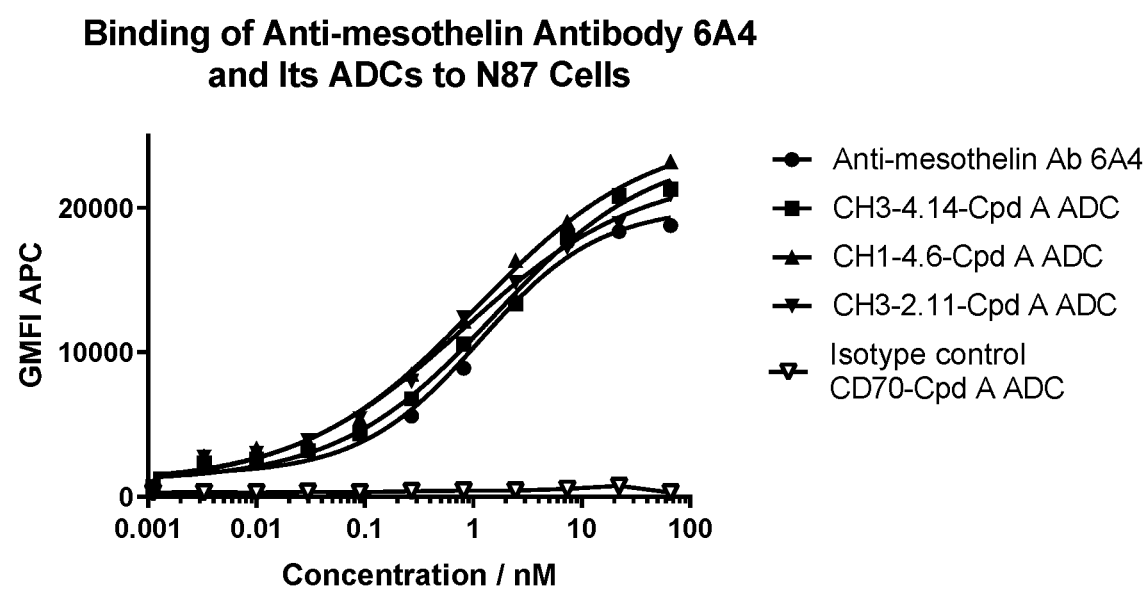

FIG. 11A, FIG. 11B, and FIG. 11C compare the binding of an anti-mesothelin antibody and its antibody drug conjugates (ADCs) to various human cancer cell lines.

DETAILED DESCRIPTION OF THE EMBODIMENTS

Definitions

"Antibody" means whole antibodies and any antigen binding fragment (i.e., "antigen-binding portion") or single chain variants thereof. A whole antibody is a protein comprising at least two heavy (H) chains and two light (L) chains inter-connected by disulfide bonds. Each heavy chain comprises a heavy chain variable region ($V_H$) and a heavy chain constant region comprising three domains, $C_{H1}$, $C_{H2}$ and $C_{H3}$. Each light chain comprises a light chain variable region ($V_L$ or $V_k$) and a light chain constant region comprising one single domain, $C_L$. The $V_H$ and $V_L$ regions can be further subdivided into regions of hypervariability, termed complementarity determining regions (CDRs), interspersed with more conserved framework regions (FRs). Each $V_H$ and $V_L$ comprises three CDRs and four FRs, arranged from amino- to carboxy-terminus in the following order: FR1, CDR1, FR2, CDR2, FR3, CDR3, and FR4. The variable regions contain a binding domain that interacts with an antigen. The constant regions may mediate the binding of the antibody to host tissues or factors, including various cells of the immune system (e.g., effector cells) and the first component (Clq) of the classical complement system. An antibody is said to "specifically bind" to an antigen X if the antibody binds to antigen X with a $K_D$ of $5 \times 10^{-8}$ M or less, more preferably $1 \times 10^{-8}$ M or less, more preferably $6 \times 10^{-9}$ M or less, more preferably $3 \times 10^{-9}$ M or less, even more preferably $2 \times 10^{-9}$ M or less. The antibody can be chimeric, humanized, or, preferably, human. The heavy chain constant region can be engineered to affect glycosylation type or extent, to extend antibody half-life, to enhance or reduce interactions with effector cells or the complement system, or to modulate some other property. The engineering can be accomplished by replacement, addition, or deletion of one or more amino acids or by replacement of a domain with a domain from another immunoglobulin type, or a combination of the foregoing.

"Antigen binding fragment" and "antigen binding portion" of an antibody (or simply "antibody portion" or "antibody fragment") mean one or more fragments of an antibody that retain the ability to specifically bind to an antigen. It has been shown that the antigen-binding function of an antibody can be performed by fragments of a full-length antibody, such as (i) a Fab fragment, a monovalent fragment consisting of the $V_L$, $V_H$, $C_L$ and $C_{H1}$ domains; (ii) a F(ab)$_2$ fragment, a bivalent fragment comprising two Fab fragments linked by a disulfide bridge at the hinge region; (iii) a Fab' fragment, which is essentially an Fab with part of the hinge region (see, for example, Abbas et al., *Cellular and Molecular Immunology*, 6th Ed., Saunders Elsevier 2007); (iv) a Fd fragment consisting of the $V_H$ and $C_{H1}$ domains; (v) a Fv fragment consisting of the $V_L$ and $V_H$ domains of a single arm of an antibody, (vi) a dAb fragment (Ward et al., (1989) *Nature* 341:544-546), which consists of a $V_H$ domain; (vii) an isolated complementarity determining region (CDR); and (viii) a nanobody, a heavy chain variable region containing a single variable domain and two constant domains. Preferred antigen binding fragments are Fab, F(ab')$_2$, Fab', Fv, and Fd fragments. Furthermore, although the two domains of the Fv fragment, $V_L$ and $V_H$, are encoded by separate genes, they can be joined, using recombinant methods, by a synthetic linker that enables them to be made as a single protein chain in which the $V_L$ and $V_H$ regions pair to form monovalent molecules (known as single chain Fv, or scFv); see, e.g., Bird et al. (1988) *Science* 242:423-426; and Huston et al. (1988) *Proc. Natl. Acad. Sci. USA* 85:5879-5883). Such single chain antibodies are also encompassed within the term "antigen-binding portion" of an antibody.

Unless indicated otherwise—for example by reference to the linear numbering in a SEQ ID NO: listing—references to the numbering of amino acid positions in an antibody heavy or light chain variable region ($V_H$ or $V_L$) are according to the Kabat system (Kabat et al., "Sequences of proteins of immunological interest, 5th ed., Pub. No. 91-3242, U.S. Dept. Health & Human Services, NIH, Bethesda, Md., 1991, hereinafter "Kabat") and references to the numbering of amino acid positions in an antibody heavy or light chain constant region ($C_{H1}$, $C_{H2}$, $C_{H3}$, or $C_L$) are according to the EU index as set forth in Kabat. See Lazar et al., US 2008/0248028 A1, the disclosure of which is incorporated herein by reference, for examples of such usage. Further, the ImMunoGeneTics Information System (IMGT) provides at its website a table entitled "IMGT Scientific Chart: Correspondence between C Numberings" showing the correspondence between its numbering system, EU numbering, and Kabat numbering for the heavy chain constant region.

An "isolated antibody" means an antibody that is substantially free of other antibodies having different antigenic specificities (e.g., an isolated antibody that specifically binds antigen X is substantially free of antibodies that specifically bind antigens other than antigen X). An isolated antibody that specifically binds antigen X may, however, have cross-reactivity to other antigens, such as antigen X molecules from other species. In certain embodiments, an isolated antibody specifically binds to human antigen X and does not cross-react with other (non-human) antigen X antigens. Moreover, an isolated antibody may be substantially free of other cellular material and/or chemicals.

"Monoclonal antibody" or "monoclonal antibody composition" means a preparation of antibody molecules of single molecular composition, which displays a single binding specificity and affinity for a particular epitope.

"Human antibody" means an antibody having variable regions in which both the framework and CDR regions (and the constant region, if present) are derived from human germline immunoglobulin sequences. Human antibodies may include later modifications, including natural or synthetic modifications. Human antibodies may include amino acid residues not encoded by human germline immunoglobulin sequences (e.g., mutations introduced by random or site-specific mutagenesis in vitro or by somatic mutation in vivo). However, "human antibody" does not include antibodies in which CDR sequences derived from the germline of another mammalian species, such as a mouse, have been grafted onto human framework sequences.

"Human monoclonal antibody" means an antibody displaying a single binding specificity, which has variable regions in which both the framework and CDR regions are derived from human germline immunoglobulin sequences. In one embodiment, human monoclonal antibodies are produced by a hybridoma that includes a B cell obtained from a transgenic nonhuman animal, e.g., a transgenic mouse, having a genome comprising a human heavy chain transgene and a light chain transgene fused to an immortalized cell.

EMBODIMENTS

Generally, transglutaminase-reactive glutamines need to be in a region of a protein chain that is protruding—i.e., exposed and accessible—and flexible. Though a wild-type antibody heavy chain has about a dozen glutamines and another half-dozen or so are present in a light chain, only one—Q295 in the heavy—can be transamidated by transglutaminase, as shown by Jeger et al. 2010. And, even so, Q295 transglutamination requires obviating glycosylation at nearby position s297.

The CH1, CH2, and CH3 domains of a heavy chain and the constant region of a light chain have protruding sequences, which we refer to as loops. Even though, with the exception of Q295, they do not possess transglutaminase-reactive glutamines, we have discovered that they can be suitable sites for protein engineering to introduce into them a transamidatable glutamine. The loops are generally protruding regions—sub-domains, as it were—in the heavy and light chain constant regions that are likely more accessible to transglutaminase, if a suitably positioned glutamine were to be present.

Figure 1:
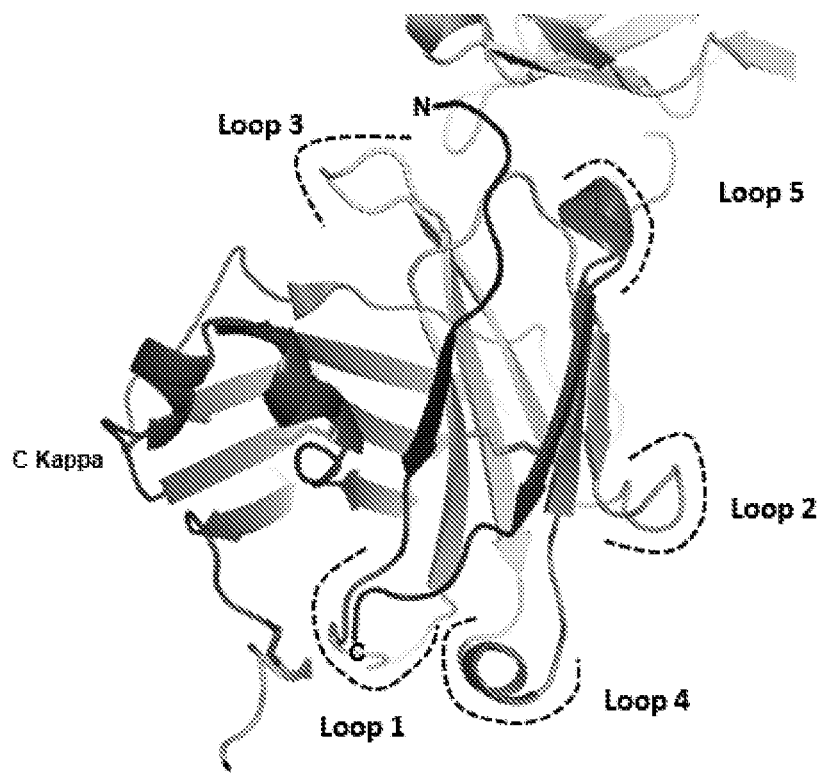
FIG. 1 is a schematic drawing showing location of the loops in the CH1 region of human IgG1, where modifications can be made as disclosed herein.

We have identified five loops in the CH1 domain of human IgG1 (hIgG1) that are candidates for modification. FIG. 1 is a schematic drawing showing the location of these loops. We also identified six such loops in the CH2 domain and five in the CH3 domain of hIgG1, their locations being shown in the schematic drawings of FIGS. 2 and 3, respectively.

FIGS. 4A, 4B and 4C show, in combination, the correlation between amino acids in human IgG1 using sequential numbering (SEQ ID NO:1) and EU numbering. Additionally, the amino acids associated with—that is, within or adjacent to—each loop are highlighted. The four human IgG isotypes—IgG1 (SEQ ID NO:1), IgG2 (SEQ ID NO:2), IgG3 (SEQ ID NO:3), and IgG4 (SEQ ID NO:4)—are highly homologous in their CH1, CH2, and CH3 domains, differing primarily in their hinge regions. When aligned according to EU numbering as show in FIGS. 5A and 5B, the high degree of homology in the loop associated amino acids among the four isotypes is readily apparent. (The EU numbering of the amino acids in hIgG2, hIgG3, and IgG4 can be derived for the correlation provided for IgG1 in FIGS. 4A-4C or by reference to publications such as Lazar et al., US 2008/0248028 A1.) In a preferred embodiment, the replacement sequences are inserted in an IgG1 antibody. In another preferred embodiment, the replacement sequences are inserted in an IgG4 antibody.

Loops that can be engineered to make glutamine available as a transglutaminase substrate are also present in the light chain. Although there is less amino acid sequence homology between the kappa and light chain types than there is among the four IgG heavy chains, there nevertheless is good structural homology. FIG. 6 shows superimposed schematic drawings of the kappa and lambda light chain constant domains and how the loop regions overlap. FIG. 7 shows the correlation between amino acids in human kappa light chain constant domain ($C_K$) using sequential numbering (SEQ ID NO:5) and EU numbering, also with the loop associated amino acids highlighted. FIG. 8 shows the alignment according to EU numbering system of the kappa and lambda light chain constant domains. (The EU numbers for the amino acids in the lambda chain constant domain (CX) can be derived from FIG. 7 or by reference to a source such as Lazar el al., US 2008/0248028 A1.)

Table A lists the associated amino acids for each loop, using EU numbering.

TABLE A

| Loops in Heavy Chain CH1-CH3 Domains and Light Chain Constant Domain | |
|---|---|
| Loop Location and Designation | Amino Acids (EU Numbers) |
| CH1 Loop 1 | 131-138 |
| CH1 Loop 2 | 159-165 |
| CH1 Loop 3 | 175-179 |
| CH1 Loop 4 | 189-197 |
| CH1 Loop 5 | 204-208 |
| CH2 Loop1 | 245-256 |

TABLE A-continued

| Loops in Heavy Chain CH1-CH3 Domains and Light Chain Constant Domain | |
|---|---|
| Loop Location and Designation | Amino Acids (EU Numbers) |
| CH2 Loop 2 | 266-274 |
| CH2 Loop 3 | 279-285 |
| CH2 Loop 4 | 295-300 |
| CH2 Loop 5 | 308-318 |
| CH2 Loop 6 | 324-331 |
| CH3 Loop 1 | 352-362 |
| CH3 Loop 2 | 383-386 |
| CH3 Loop 3 | 397-403 |
| CH3 Loop 4 | 413-420 |
| CH3 Loop 5 | 429-435 |
| Kappa Loop 1 | 121-128 |
| Kappa Loop 2 | 151-158 |
| Kappa Loop 3 | 165-172 |
| Kappa Loop 4 | 182-190 |
| Kappa Loop 5 | 197-204 |

There are various methods for engineering a loop so that it contains a glutamine that can serve as a transglutaminase substrate. The engineering can take place within a loop, or at the periphery thereof.

Some loops comprise a helix whose coiled nature inhibits transamidation, even when a native glutamine is present, as in the case of CH3 Loop 4. Disruption of the helix leads to an extended flexible loop, wherein a glutamine therein may be transamidatable. A serine, proline or glycine can be used to disrupt the loop. This concept is illustrated schematically in FIG. 8. (The viewing angle is different from that of FIG. 3.)

A glutamine in a replacement sequence preferably flanked on the amino side by a valine and a leucine, as in -VLQ-, as a preferred substrate motif for transglutaminase. Thus, preferred replacement sequences comprise the tripeptide -VLQ-.

A glutamine natively present in a loop, but which is unfavorably located for transamidation, can be replaced with a different amino acid and another glutamine can be inserted into the loop at a more favorable location. Or, the replacement sequence can be designed to situate native glutamine more favorably to transamidation.

As a demonstration, we modified an IgG1 anti-mesothelin antibody having the same heavy and light chain CDRs as antibody 6A4 of Terrett et al., U.S. Pat. No. 8,268,970 B2 (2012). Its heavy and light chain sequences are provided as SEQ ID NO:98 and SEQ ID NO:99, respectively. Table B lists the replacements that were made in its CH1 domain.

TABLE B

| Heavy Chain CH1 Domain Replacements | | | | |
|---|---|---|---|---|
| | Replacement Sequence | | Replacement Location and Replaced Amino Acids | |
| Reference | Replacement Sequence | SEQ ID. No: | Location | Replaced Amino Acids (EU Nos.) |
| CH1-L1a | VLQYA | 7 | Loop 1 | SSKST (131-135) |
| CH1-L1b | SSVLQYAST | 8 | Loop 1 | Same as above |
| CH1-1.7 | SSKSVLQYT | 9 | Loop 1 | Same as above |
| CH1-L1c | SSKSLQYT | 10 | Loop 1 | Same as above |

TABLE B-continued

Heavy Chain CH1 Domain Replacements

| | Replacement Sequence | | Replacement Location and Replaced Amino Acids | |
|---|---|---|---|---|
| Reference | Replacement Sequence | SEQ ID. No: | Location | Replaced Amino Acids (EU Nos.) |
| CH1-L2a | SGALQT | 11 | Loop 2 | SGALT (160-164) |
| CH1-L2b | SGAVLQT | 12 | Loop 2 | Same as above |
| CH1-L2c | SGALQ | 13 | Loop 2 | Same as above |
| CH1-L2d | SGVLQYA | 14 | Loop 2 | Same as above |
| CH1-L2f | VLQYSGALT | 16 | Loop 2 | Same as above |
| CH1-L2g | LQYSGALT | 17 | Loop 2 | Same as above |
| CH1-L3a | VLQ | 18 | Loop 3 | QSS (175-177) |
| CH1-L3b | VLQYAS | 19 | Loop 3 | Same as above |
| CH1-L3c | SVLQYAS | 20 | Loop 4 | Same as above |
| CH1-4.6 | VLQYLGTQ | 22 | Loop 4 | SSSLGTQ (190-196) |
| CH1-L4c | LQYLGTQ | 23 | Loop 4 | Same as above |
| CH1-L5a | PVLQYAS | 24 | Loop 5 | PS (206-207) |

Table C lists the replacements that were made in its CH2 domain.

TABLE C

Heavy Chain CH2 Domain Replacements

| | Replacement Sequence | | Replacement Location and Replaced Amino Acids | |
|---|---|---|---|---|
| Reference | Replacement Sequence | SEQ ID. No: | Location | Replaced Amino Acids (EU Nos.) |
| CH2-L2a | LQVSHE | 25 | Loop 2 | VDVSHE (264-269) |
| CH2-L2b | LQYAHE | 26 | Loop 2 | Same as above |
| CH2-2.7 | VDVSHVLQYA | 27 | Loop 2 | Same as above |
| CH2-2.8 | VDVSHVLQY | 28 | Loop 2 | Same as above |
| CH2-L3a | VLQYAEV | 29 | Loop 3 | DGVEV (280-284) |
| CH2-L3b | DGVLQYAEV | 30 | Loop 3 | Same as above |
| CH2-L3c | DGVLQYA | 31 | Loop 3 | Same as above |
| CH2-L4b | REEAYQ | 33 | Loop 4 | REEQYN (292-297) |
| CH2-4.9 | REEQYASN | 34 | Loop 4 | Same as above |
| CH2-4.10 | REEVLQYN | 35 | Loop 4 | Same as above |
| CH2-4.10a | REEVALYA | 100 | Loop 4 | Same as above |
| CH2-4.11 | RLQYAN | 36 | Loop 4 | Same as above |
| CH2-4.12 | RLQQAN | 37 | Loop 4 | Same as above |

TABLE C-continued

Heavy Chain CH2 Domain Replacements

| | Replacement Sequence | | Replacement Location and Replaced Amino Acids | |
|---|---|---|---|---|
| Reference | Replacement Sequence | SEQ ID. No: | Location | Replaced Amino Acids (EU Nos.) |
| CH2-4.13 | RLQQYA | 38 | Loop 4 | Same as above |
| CH2-4.14 | VLQYAN | 39 | Loop 4 | Same as above |
| CH2-4.15 | REVLQN | 40 | Loop 4 | Same as above |
| CH2-4.16 | REVLQYN | 41 | Loop 4 | Same as above |
| CH2-4.16a | REVLQYA | 101 | Loop 4 | Same as above |
| CH2-4.17 | REVLQA | 42 | Loop 4 | Same as above |
| CH2-4.18 | REVLQQ | 43 | Loop 4 | Same as above |
| CH2-4.19 | REEAVLQYAN | 44 | Loop 4 | Same as above |
| CH2-4.19a | REEAVLQYAA | 102 | Loop 4 | Same as above |
| CH2-4.20 | REEAVLQYN | 45 | Loop 4 | Same as above |
| CH2-4.20a | REEAVLQYA | 103 | Loop 4 | Same as above |
| CH2-L4g | RELQYN | 47 | Loop 4 | Same as above |
| CH2-L5a | VLQGKEY | 48 | Loop 5 | LNGKEY (314-319) |
| CH2-L5b | LVLQGKEY | 49 | Loop 5 | Same as above |
| CH2-L5c | LNGKVLQY | 50 | Loop 5 | Same as above |
| CH2-L6a | LQAP | 51 | Loop 6 | AP (330-331) |
| CH2-6.5 | VLQAP | 52 | Loop 6 | Same as above |
| CH2-6.6 | VLQYAP | 53 | Loop 6 | Same as above |

Table D lists the replacements that were made in its CH3 domain.

TABLE D

Heavy Chain CH3 Domain Replacements

| | Replacement Sequence | | Replacement Location and Replaced Amino Acids | |
|---|---|---|---|---|
| Reference | Replacement Sequence | SEQ ID. No: | Location | Replaced Amino Acids (EU Nos.) |
| CH3-L1a | EQYAQ | 54 | Loop 1 | LTKNQ (358-362) |
| CH3-L1b | MTKVLQYAS | 55 | Loop 1 | Same as above |
| CH3-L2/3a | VLQYANNYKTTPPVLDSDG | 56 | Loops 2/3 | NGQPENNYKTPPVLDSDG (384-402) |
| CH3-2.11 | NVLQGSPENNYKTTPPVLDSDG | 57 | Loops 2/3 | Same as above |
| CH3-2.12 | NVLQYAPENNYKTTPPVLDSDG | 58 | Loops 2/3 | Same as above |

TABLE D-continued

Heavy Chain CH3 Domain Replacements

| Replacement Sequence | | | Replacement Location and Replaced Amino Acids | |
|---|---|---|---|---|
| Reference | Replacement Sequence | SEQ ID. No: | Location | Replaced Amino Acids (EU Nos.) |
| CH3-L2/3b | NGQPENVLQYAKTTPPVLDSDG | 59 | Loops 2/3 | Same as above |
| CH3-L2/3c | NGQPEVLQYANYKTTPPVLDSDG | 60 | Loops 2/3 | Same as above |
| CH3-L2/3d | NGQPENNYKTTPPVLQYAG | 61 | Loops 2/3 | Same as above |
| CH3-L2/3e | NGQPENNYKTTPPVLVLQYADG | 62 | Loops 2/3 | Same as above |
| CH3-3.8 | NGQPENNYKTTPPVLDSVLQYAG | 63 | Loops 2/3 | Same as above |
| CH3-L2/3f | NGQPENNYKTTPVLQYAST | 64 | Loops 2/3 | Same as above |
| CH3-L4a | VLQYARWNN | 65 | Loop 4 | KSRWQQ (414-419) |
| CH3-4.12 | VLQYASRWNN | 66 | Loop 4 | Same as above |
| CH3-L4b | KSRWNVLQYA | 67 | Loop 4 | Same as above |
| CH3-4.14 | KSRGNVLQYA | 68 | Loop 4 | Same as above |
| CH3-L4c | KSRVLQ | 69 | Loop 4 | Same as above |

Table E lists the replacements that were made in its light chain (kappa) constant domain.

TABLE E

Light Chain Constant Domain Replacements

| Replacement Sequence | | | Replacement Location and Replaced Amino Acids | |
|---|---|---|---|---|
| Reference | Replacement Sequence | SEQ ID. No: | Location | Replaced Amino Acids (EU Nos.) |
| CK-L1a | DEQLVLQYA | 70 | Loop 1 | DEQLK (122-126) |
| CK-L1b | SGGVLQYAGG | 71 | Loop 1 | Same as above |
| CK-L1c | SGVLQYAG | 72 | Loop 1 | Same as above |
| CK-2.12 | GVLQYAGALN | 73 | Loop 2 | NALQ (152-155) |
| CK-L2a | NAVLQYA | 74 | Loop 2 | Same as above |
| CK-2.14 | NAGGVLQYA | 75 | Loop 2 | Same as above |
| CK-L3a | DVLQYA | 76 | Loop 3 | DSKD (167-170) |
| CK-L3b | DVLQYAD | 77 | Loop 3 | Same as above |
| CK-L3c | DSVLQYAD | 78 | Loop 3 | Same as above |

TABLE E-continued

Light Chain Constant Domain Replacements

| Replacement Sequence | | | Replacement Location and Replaced Amino Acids | |
|---|---|---|---|---|
| Reference | Replacement Sequence | SEQ ID. No: | Location | Replaced Amino Acids (EU Nos.) |
| CK-L3d | GSVLQYAG | 79 | Loop 3 | Same as above |
| CK-L3e | DSVLQYKD | 81 | Loop 3 | Same as above |
| CK-3.7 | DSLQYKD | 82 | Loop 3 | Same as above |
| CK-L4a | SVLQYADYEKH | 83 | Loop 4 | SKADYEKHK (182-190) |
| CK-L4b | VLQYADYEKH | 84 | Loop 4 | Same as above |
| CK-L4c | SGGVLQYASGGH | 85 | Loop 4 | Same as above |
| CK-L4d | SKADYEVLQYHK | 86 | Loop 4 | Same as above |
| CK-L4e | SKADYEKVLQYK | 87 | Loop 4 | Same as above |
| CK-L5b | QGVVQY | 89 | Loop 5 | QGLSSP (199-204) |
| CK-L5c | LGQYSP | 90 | Loop 5 | Same as above |
| CK-L5d | QGLQYSP | 91 | Loop 5 | Same as above |
| CK-L5e | QVLQYSP | 92 | Loop 5 | Same as above |
| CK-5.15 | QVLQYASP | 93 | Loop 5 | Same as above |
| CK-5.16 | NVLQYSP | 94 | Loop 5 | Same as above |
| CK-L5g | VLQYASP | 95 | Loop 5 | Same as above |
| CK-L5h | VLQYASSP | 96 | Loop 5 | Same as above |

The antibodies of this invention can be either homodimeric or heterodimeric. If homodimeric, the two light-heavy chain pairs are identical; that is, each light-heavy chain pair contains the same replacement sequence and the same variable regions. A heterodimeric antibody can be so in the sense that, while both light-heavy chain pairs have the same variable regions, only one of the two light-heavy chain pairs contains a replacement sequence or each light-heavy chain pair contains a different replacement sequence. Alternatively, a heterodimeric antibody can be so in the sense that it is bispecific, that is, each light-heavy chain pair has different variable regions so that it specifically binds a different antigen, while having the same the same replacement sequences. Lastly, a heterodimeric antibody can be heterodimeric in both senses.

Antibodies that can be modified and conjugated by the methods of this disclosure include those recognizing the following antigens: mesothelin, prostate specific membrane antigen (PSMA), CD19, CD22, CD30, CD70, B7H3, B7H4 (also known as O8E), protein tyrosine kinase 7 (PTK7), glypican-3, RG1, fucosyl-GM1, CTLA-4, and CD44. The antibody can be animal (e.g., murine), chimeric, humanized, or, preferably, human. The antibody preferably is monoclonal, especially a monoclonal human antibody. The preparation of human monoclonal antibodies against some of the aforementioned antigens is disclosed in Korman et al., U.S.

Pat. No. 8,609,816 B2 (2013; B7H4, also known as 08E; in particular antibodies 2A7, 1G11, and 2F9); Rao-Naik et al., U.S. Pat. No. 8,097,703 B2 (2012; CD19; in particular antibodies 5G7, 13F1, 46E8, 21D4, 21D4a, 47G4, 27F3, and 3C10); King et al., U.S. Pat. No. 8,481,683 B2 (2013; CD22; in particular antibodies 12C5, 19A3, 16F7, and 23C6); Keler et al., U.S. Pat. No. 7,387,776 B2 (2008; CD30; in particular antibodies 5F11, 2H9, and 17G1); Terrett et al., U.S. Pat. No. 8,124,738 B2 (2012; CD70; in particular antibodies 2H5, 10B4, 8B5, 18E7, and 69A7); Korman et al., U.S. Pat. No. 6,984,720 B1 (2006; CTLA-4; in particular antibodies 10D1, 4B6, and 1E2); Vistica et al., U.S. Pat. No. 8,383,118 B2 (2013, fucosyl-GM1, in particular antibodies 5B1, 5B1a, 7D4, 7E4, 13B8, and 18D5) Korman et al., U.S. Pat. No. 8,008,449 B2 (2011; PD-1; in particular antibodies 17D8, 2D3, 4H1, 5C4, 4A11, 7D3, and 5F4); Huang et al., US 2009/0297438 A1 (2009; PSMA. in particular antibodies 1C3, 2A10, 2F5, 2C6); Cardarelli et al., U.S. Pat. No. 7,875,278 B2 (2011; PSMA; in particular antibodies 4A3, 7F12, 8C12, 8A11, 16F9, 2A10, 2C6, 2F5, and 1C3); Terrett et al., U.S. Pat. No. 8,222,375 B2 (2012; PTK7; in particular antibodies 3G8, 4D5, 12C6, 12C6a, and 7C8); Terrett et al., U.S. Pat. No. 8,680,247 B2 (2014; glypican-3; in particular antibodies 4A6, 11E7, and 16D10); Harkins et al., U.S. Pat. No. 7,335,748 B2(2008; RG1; in particular antibodies A, B, C, and D); Terrett et al., U.S. Pat. No. 8,268,970 B2 (2012; mesothelin; in particular antibodies 3C10, 6A4, and 7B1); Xu et al., US 2010/0092484 A1 (2010; CD44; in particular antibodies 14G9.B8.B4, 2D1.A3.D12, and 1A9.A6.B9); Deshpande et al., U.S. Pat. No. 8,258,266 B2 (2012; IP10; in particular antibodies 1D4, 1E1, 2G1, 3C4, 6A5, 6A8, 7C10, 8F6, 10A12, 10A12S, and 13C4); Kuhne et al., U.S. Pat. No. 8,450,464 B2 (2013; CXCR4; in particular antibodies F7, F9, D1, and E2); and Korman et al., U.S. Pat. No. 7,943,743 B2 (2011; PD-L1; in particular antibodies 3G10, 12A4, 10A5, 5F8, 10H10, 1B12, 7H1, 11E6, 12B7, and 13G4); the disclosures of which are incorporated herein by reference.

In respect of conjugates of formula (IV)

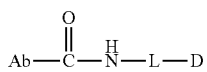

(IV)

(a) D preferably is, in one embodiment, cytotoxic drug.
(b) In another preferred embodiment, D is a TLR7, STING, NRLP3, or RIG-1 agonist.
(c) In a preferred embodiment, L is —$(CH_2)_{2-6}$—.
(d) In another preferred embodiment, L is

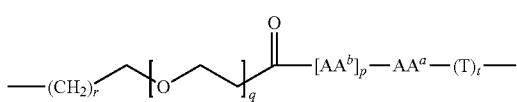

(Ia')

wherein
T is a self-immolating group;
t is 0 or 1;
$AA^a$ and each $AA^b$ are independently selected from the group consisting of alanine, β-alanine, γ-aminobutyric acid, arginine, asparagine, aspartic acid, γ-carboxyglutamic acid, citrulline, cysteine, glutamic acid, glutamine, glycine, histidine, isoleucine, leucine, lysine, methionine, norleucine, norvaline, ornithine, phenylalanine, proline, serine, threonine, tryptophan, tyrosine, and valine;
p is 1, 2, 3, or 4;
q is 0, 1, 2, 3, 4, 5, 6, 7, 8, 9, or 10; and
r is 1, 2, 3, 4, or 5.

Figure 2:
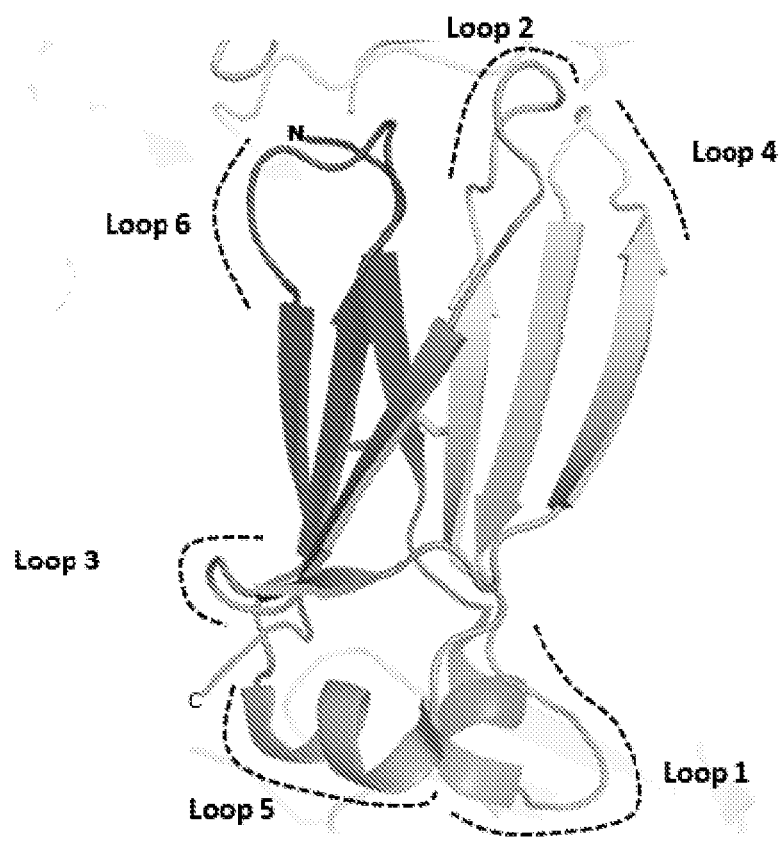
FIG. 2 is a schematic drawing showing the location of the loops in the CH2 region of human IgG1, where modifications can be made as disclosed herein.
Figure 3:
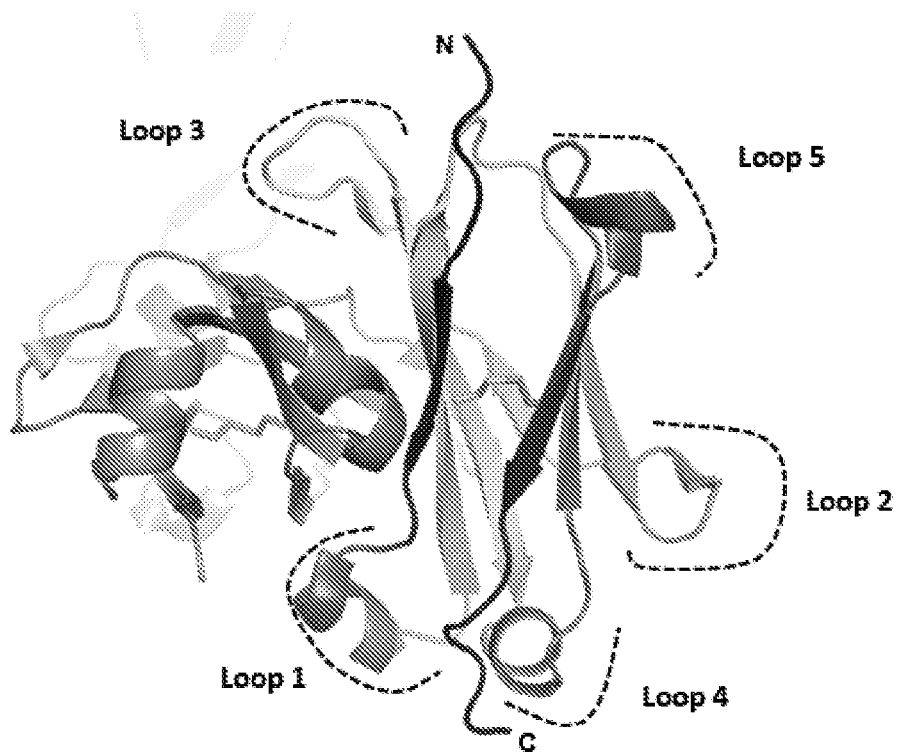
FIG. 3 is a schematic drawing showing the location of the loops in the CH3 region of human IgG1, where modifications can be made as disclosed herein.

Generally, transglutaminase-mediated preparation of an antibody conjugate can be by a one-step process or a two-step process, as illustrated schematically in FIG. 2. In the one-step process, transglutaminase couples a glutamine carboxamide on the extension, acting as the amine acceptor, and an amine donor compound $H_2N$-L-D, where L is a linker moiety and partner molecule D is a protein, a radioisotope, an assay agent, or a therapeutic agent, to form the conjugate directly. In the two-step process, transglutaminase catalyzes the formation of an initial transamidation adduct between a glutamine carboxamide on the extension, acting as the amine receptor, and first compound ($H_2N$-L'-R'), which is an amine donor compound, where L' is a first linker moiety and R' is a first reactive functional group. Subsequently, the adduct is reacted with a second compound (R"-L"-D), where R" is a second reactive functional group capable of reacting with R', L" is a second linker moiety, and D is as defined above. Sometimes, the one-step process is referred to as the enzymatic process, and the two-step process as the chemoenzymatic process because it entails both a chemical and an enzymatic step. Each of L, L', and L" can be an alkyl chain —$(CH_2)_m$— where m is an integer from 2 to 10, inclusive, or can be, especially in the case of L and L", a more complex structure, as discussed below.

The amine donor, whether $H_2N$-L-D or $H_2N$-L'-R', is often used in large excess to suppress undesired transamidation between the glutamine carboxamide and an ε-amino group of an antibody lysine. If the moiety D is expensive or difficult to obtain, the use of a large excess may be impractical. In such instances, the two-step process may be preferable, even though it requires an additional step.

In a preferred embodiment, amine donor compound in a one-step process is represented by formula (I):

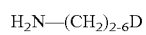

(I)

where D is a protein, a radioisotope, an assay agent, or a therapeutic agent.

In another preferred embodiment, the amine donor compound for the one-step process has a structure represented by formula (Ia):

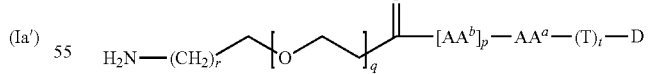

(Ia)

wherein
D is a protein, a radioisotope, an assay agent, or a therapeutic agent;
T is a self-immolating group;
t is 0 or 1;
$AA^a$ and each $AA^b$ are independently selected from the group consisting of alanine, β-alanine, γ-aminobutyric acid, arginine, asparagine, aspartic acid, γ-carboxyglutamic acid, citrulline, cysteine, glutamic acid, glutamine, glycine, histidine, isoleucine, leucine, lysine, methionine, norleucine, norvaline, ornithine, phenylalanine, proline, serine, threonine, tryptophan, tyrosine, and valine;

p is 1, 2, 3, or 4;

q is 0, 1, 2, 3, 4, 5, 6, 7, 8, 9, or 10; and r is 1, 2, 3, 4, or 5.

In formula (Ia), (Ia'), and (III) herein, -AA$^a$-[AA$^b$]$_p$- represents a polypeptide whose length is determined by the value of p (dipeptide if p is 1, tetrapeptide if p is 3, etc.). AA$^a$ is at the carboxy terminus of the polypeptide and its carboxyl group forms a peptide (amide) bond with an amine nitrogen of D (or T, if present). Conversely, the last AA$^b$ is at the amino terminus of the polypeptide and its α-amino group forms a peptide bond with

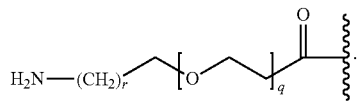

Preferred polypeptides -AA$^a$-[AA$^b$]$_p$- are Val-Cit, Val-Lys, Lys-Val-Ala, Asp-Val-Ala, Val-Ala, Lys-Val-Cit, Ala-Val-Cit, Val-Gly, Val-Gln, and Asp-Val-Cit, written in the conventional N-to-C direction, as in H$_2$N-Val-Cit-CO$_2$H). More preferably, the polypeptide is Val-Cit, Val-Lys, or Val-Ala. Preferably, a polypeptide -AA$^a$-[AA$^b$]$_p$- is cleavable by an enzyme found inside the target cell, for example a cathepsin and especially cathepsin B, or an enzyme in the environs of the target organ or tissue.

If the subscript s is 1, compound (Ia) contains a poly(ethylene glycol) (PEG) group, which can advantageously improve the solubility of compound (Ia), facilitating conjugation to the antibody—a step that is performed in aqueous media. Also, a PEG group can serve as a spacer between the antibody and the peptide -AA$^a$-[AA$^b$]$_p$-, so that the bulk of the antibody does not sterically interfere with action of a peptide-cleaving enzyme.

As indicated by the subscript t equals 0 or 1, a self-immolating group T is optionally present. A self-immolating group is one such that cleavage from AA$^a$ or AA$^b$, as the case may be, initiates a reaction sequence resulting in the self-immolating group disbonding itself from D and freeing the latter to exert its therapeutic function. When present, the self-immolating group T preferably is a p-aminobenzyl oxycarbonyl (PABC) group, whose structure is shown below, with an asterisk (*) denoting the end of the PABC bonded to an amine nitrogen of D and a wavy line ( ~~~ ) denoting the end bonded to the polypeptide -AA$^a$-[AA$^b$]$_p$-. The PABC group can be substituted, as disclosed in U.S. application Ser. No. 16/425,596, filed May 29, 2019.

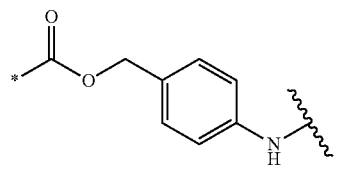 [SMILES: *Nc1ccc(COC(*)=O)cc1]

Another self-immolating group that can be used is a substituted thiazole, as disclosed in Feng, U.S. Pat. No. 7,375,078 B2 (2008).

In a two-step conjugation, many combinations of groups R' and R" can be used. Suitable combinations of R' and R" (or, vice-versa, R" and R') include:

(a) a maleimide group and a sulfhydryl group, to form a Michael addition adduct, as in

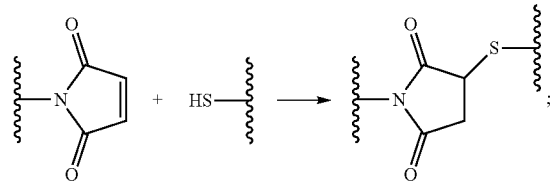

(b) a dibenzocyclooctyne group and an azide group, to form a cycloaddition product via "click" chemistry, as in

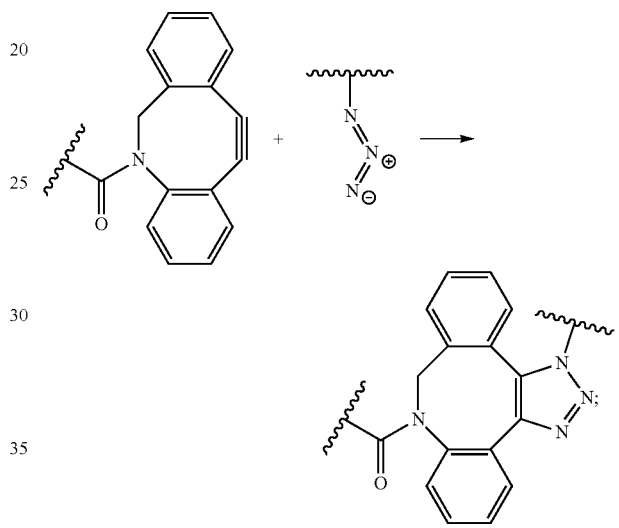

(c) an N-hydroxysuccinimide ester and an amine, to form an amide, as in

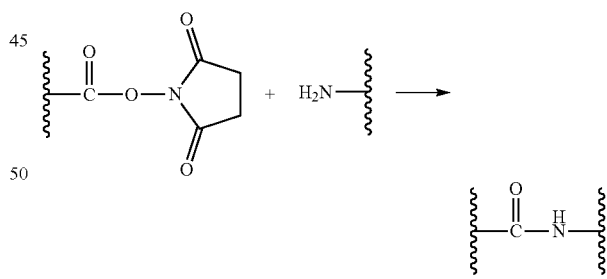

and (d) an aldehyde or ketone (where "alkyl" preferably is C$_{1-3}$ alkyl) and a hydroxylamine, to form an oxime, as in

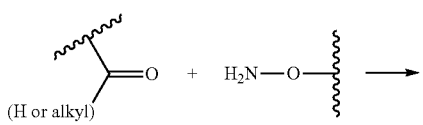

-continued

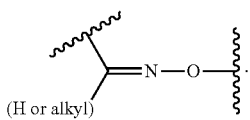
(H or alkyl)

Thus, R' can be selected from

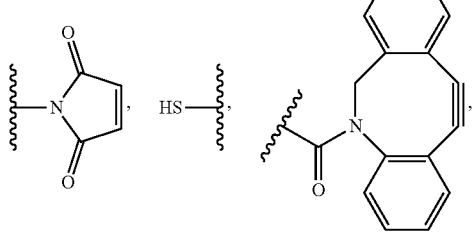

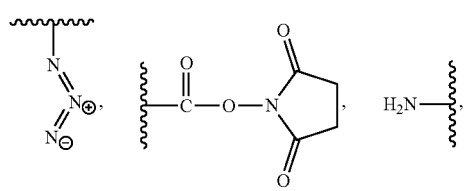

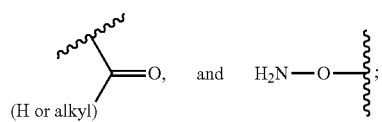
(H or alkyl)

while, reciprocally, R" can be selected from

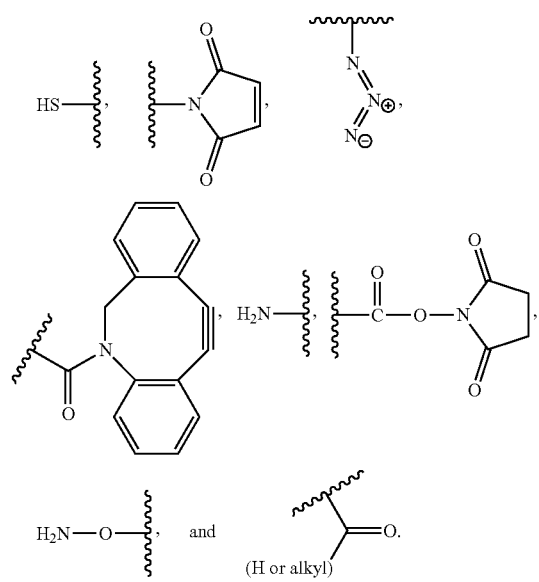
(H or alkyl)

A suitable amine donor first compound for the two-step process is depicted in formula (II)

$$H_2N—(CH_2)_{2-8}R'$$  (II)

where R' is as defined above and preferably is

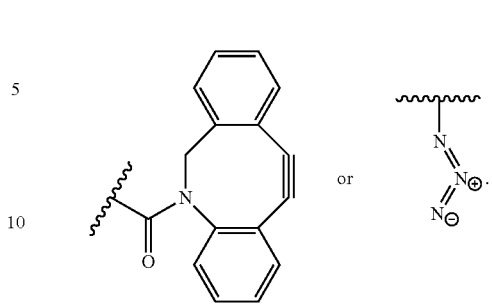

A corresponding suitable compound R"-L"-D is shown in formula (III)

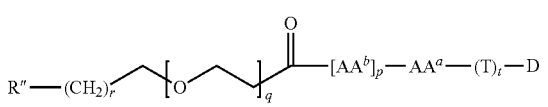
(III)

where R" is as defined above and preferably is

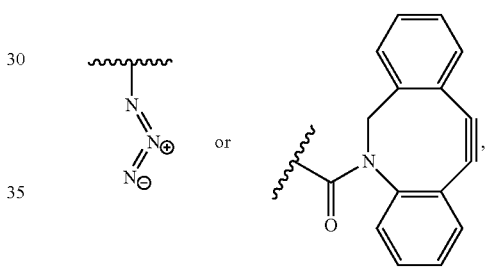

and r, q, $AA^b$, p, $AA^a$, T, t, and D are as defined above in respect of formula (Ia).

In the instance where the conjugate is intended for use in cancer treatment, the therapeutic agent can be a cytotoxic drug that causes death of the targeted cancer cell. Cytotoxic drugs that can be used in conjugates include the following types of compounds and their analogs and derivatives:
  (a) enediynes such as calicheamicin (see, e.g., Lee et al., J. Am. Chem. Soc. 1987, 109, 3464 and 3466) and uncialamycin (see, e.g., Davies et al., WO 2007/038868 A2 (2007); Chowdari et al., U.S. Pat. No. 8,709,431 B2 (2012); and Nicolaou et al., WO 2015/023879 A1 (2015));
  (b) tubulysins (see, e.g., Domling et al., U.S. Pat. No. 7,778,814 B2 (2010); Cheng et al., U.S. Pat. No. 8,394,922 B2 (2013); and Cong et al., U.S. Pat. No. 8,980,824 B2 (2015));
  (c) DNA alkylators such as analogs of CC-1065 and duocarmycin (see, e.g., Yang et al., US 2018/0051031 A1 (2018); Boger, U.S. Pat. No. 6,5458,530 B1 (2003); Sufi et al., U.S. Pat. No. 8,461,117 B2 (2013); and Zhang et al., U.S. Pat. No. 8,852,599 B2 (2014));
  (d) epothilones (see, e.g., Vite et al., US 2007/0275904 A1 (2007) and U.S. RE42930 E (2011));
  (e) auristatins (see, e.g., Senter et al., U.S. Pat. No. 6,844,869 B2 (2005) and Doronina et al., U.S. Pat. No. 7,498,298 B2 (2009));

(f) benzodiazepine dimers (see, e.g., Zhang et al., U.S. Pat. No. 9,527,871 B2 (2016); Zhang et al., U.S. Pat. No. 9,688,694 B2 (2017); McDonald et al., U.S. Pat. No. 9,526,801 B2 (2016); Howard et al., US 2013/0059800 A1(2013); US 2013/0028919 A1 (2013); and WO 2013/041606 A1 (2013)); and (g) maytansinoids such as DM1 and DM4 (see, e.g., Chari et al., U.S. Pat. No. 5,208,020 (1993) and Amphlett et al., U.S. Pat. No. 7,374,762 B2 (2008)).

Preferably, the drug is a DNA alkylator, tubulysin, auristatin, pyrrolobenzodiazepine, enediyne, or maytansinoid compound. Specific examples are, by way of illustration and not of limitation:

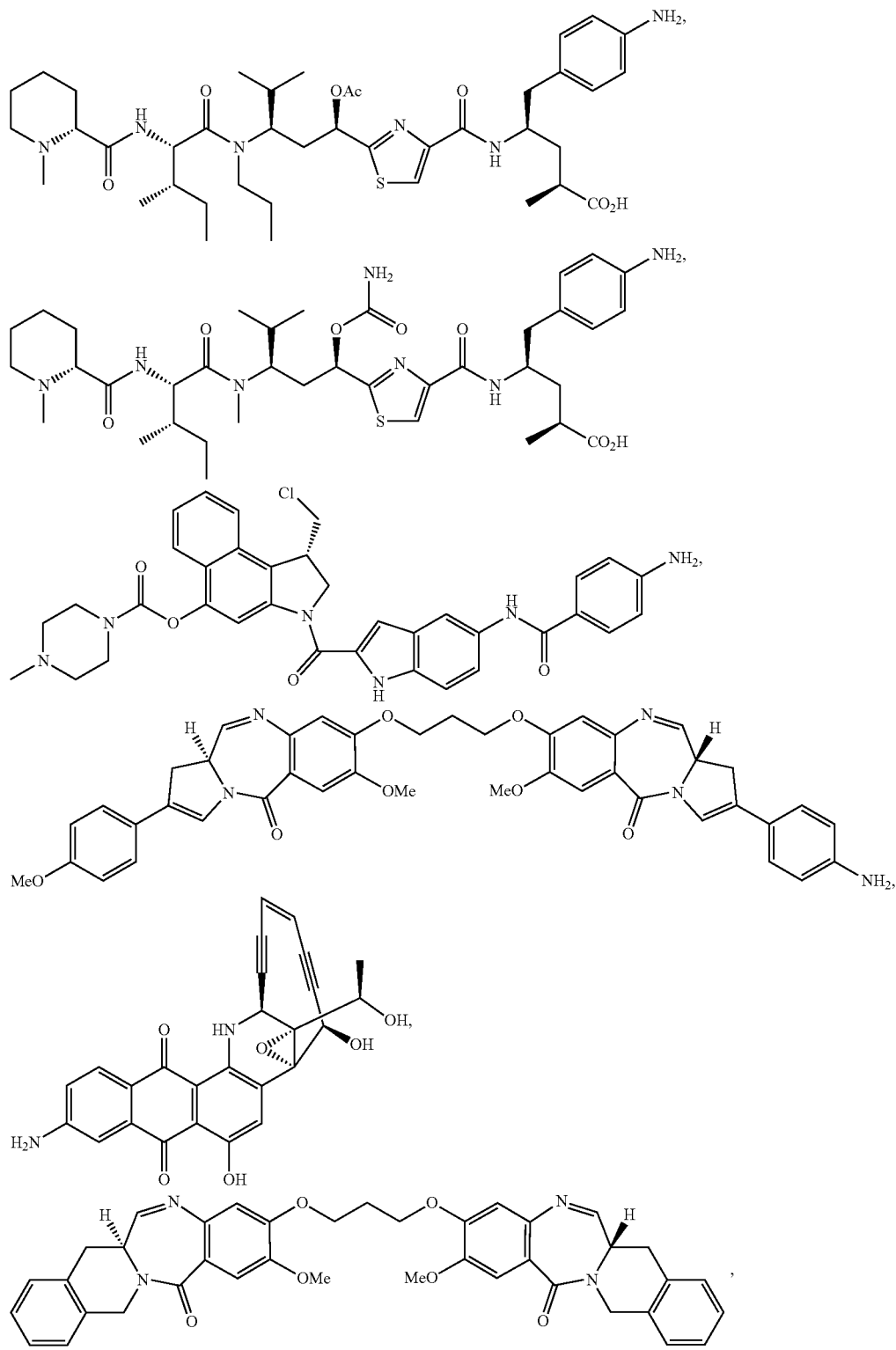

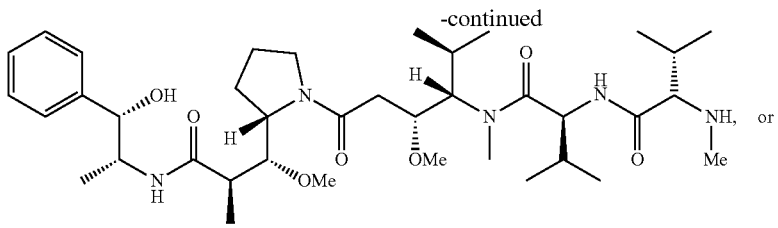

-continued

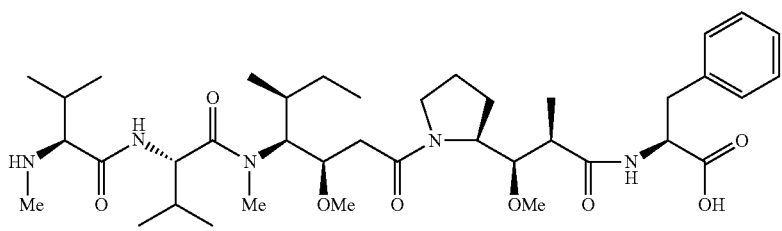

The immune system has receptors whose natural ligands are pathogen-associated molecular patterns (PAMPs). The binding of a PAMP to its cognate receptor activates the immune system to defend against an infection by the associated pathogen. Additionally, these receptors also can be activated by synthetic agonists that have an adjuvant effect on the action of vaccines and immunotherapy agents in treating a variety of conditions other than actual pathogen infection. Immuno-oncology agents such as ipilimumab, nivolumab, and pembrolizumab in particular can benefit from this adjuvant effect. Receptors that can be activated by synthetic agonists include TLR3, TLR7, TLR9 (Toll-like receptor-3, -7, and -9, respectively), STING (STimulator of INterferon Genes; also known as MPYS, TMEM173, MITA or ERIS), NLRP3 (NOD-like receptor protein 3), and RIG-I (retinoic acid inducible gene I). Thus, in an alternative embodiment, the therapeutic agent is a TLR3, TLR7, TLR9, STING, NLRP3, or RIG-I agonist. In particular, the therapeutic agent can be a TLR7 agonist as disclosed in Poudel et al., US 2019/0055243 A1 (2019); Young et al., US 2019/0055244 A1 (2019); Poudel et al., US 2019/0055245 A1 (2019); He et al., US 2019/0055246 A1 (2019); He et al., US 2019/0055247 A1 (2019); and Purandare et al., PCT Application PCT/US2019/028697, filed Apr. 23, 2019.

EXAMPLES

The practice of this invention can be further understood by reference to the following examples, which are provided by way of illustration and not of limitation.

Example 1—Conjugation of Modified Antibodies

Modified antibodies disclosed herein were conjugated to Compound A (Young et al., U.S. application Ser. No. 16/437, 047, filed Jun. 11, 2019), which has a tubulysin analog as an anti-cancer drug and a dipeptide linker terminated with an alkyl amino group that can serve as an amine donor:

Compound A

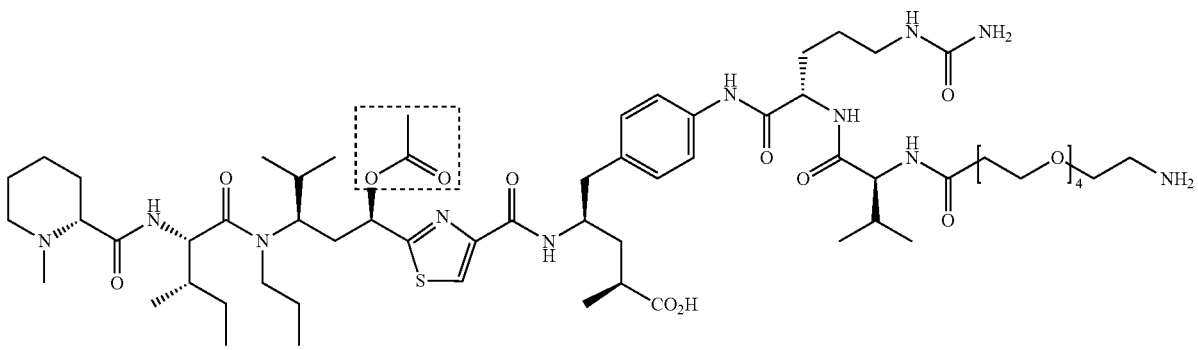

Conjugation of an antibody modified as described herein with compound A as an amine donor using recombinant bacterial transglutaminase was performed by the protocol listed below.

Conjugation of an antibody modified as described herein with an amine donor using transglutaminase was performed by the protocol listed below. We used dispase activate BTGase with V65I and Y75F point mutations. It was dialyzed it into 50 mM sodium acetate pH5.5 from formulation (buffer 20 mM acetate, 10% glycerol pH4) before use.

The antibody, at ~2 mg/mL, in 50 mM Tris-HCl, pH 8.0, or 20 mM Histidine, 50 mM Imidizaole, 10% sucrose, pH~7.8 was reacted with 10-fold molar per site excess of the amine donor in the presence of 0.2 molar excess of transglutaminase per antibody. The reaction was allowed to proceed overnight at 37° C. with continuous gentle mixing.

The antibody drug conjugate was 0.2 μm filtered and purified using a mAb Select SuRe™ column (GE Healthcare). The conjugate was loaded onto the column pre-equilibrated with 50 mM Tris-HCl, pH 8.0 and washed with 10 CV (column volumes) of equilibrating buffer followed by 10 CV of 50 mM Tris-HCl, 17% acetonitrile, pH 8.0 to remove unreacted amine donor. The column was re-equilibrated with 50 mM Tris-HCl, pH 8.0 before elution with 0.1 M citrate, pH 3.5 in 1 mL fractions and neutralized with 1/10 of elution volume with 1 M Tris, pH 8.0. The desired fractions are dialyzed in formulation buffer 20 mM Histidine, 10% Sucrose, pH 6.0 and analyzed by LC-MS (ESI-QTOF), RP-HPLC and SDS-PAGE for purity and Drug to Antibody Ratio (DAR).

Example 2—Characterization of Conjugated Modified Antibodies

Anti-mesothelin antibody 6A4 of Terrett et al., U.S. Pat. No. 8,268,970 B2 (2012), was used as a model antibody for evaluating the performance of the replacement sequences disclosed herein in enabling conjugation to Compound A by transglutaminase. To prevent enzyme-mediated conjugation, the antibody contained the K222R site specific mutation.

The antibody at 5 mg/mL in 50 mM imidazole, 10% sucrose, pH 8 was reacted with 10-fold molar per site of the amine donor in the presence of 0.2 molar excess of recombinant bacterial transglutaminase per antibody. After overnight incubation at 37° C. with continuous gentle mixing, the reaction mixture was analyzed by LC-MS (ESI-QTOF) for DAR evaluation.

Antibodies that were identified by the above procedure as having been conjugated by transglutaminase are listed in Table F. The drug-antibody ratio or DAR is the number of drug moieties (the tubulysin analog) attached to each antibody. Unglycosylated antibodies had Q295A and N297A mutations, thus removing the wild-type N297A glycosylation site.

TABLE F

Antibodies Conjugated with Compound A by Transglutaminase

| Replacement Sequence Ref. | SEQ ID NO. | Maximum Theoretical DAR | DAR by MS | Glycosylation Present? |
|---|---|---|---|---|
| CH1-1.7 | 9 | 2 | 1.3 | No |
| CH1-L1c | 10 | 2 | 0.69 | No |
| CH1-L3c | 18 | 2 | 0.79 | No |
| CH1-4.6 | 22 | 2 or 4 | 1.9, 1.8 | No |
| CH2-2.7 | 27 | 2 | 0.3 | No |
| CH2-2.8 | 28 | 2 | 0.07 | No |

TABLE F-continued

Antibodies Conjugated with Compound A by Transglutaminase

| Replacement Sequence Ref. | SEQ ID NO. | Maximum Theoretical DAR | DAR by MS | Glycosylation Present? |
|---|---|---|---|---|
| CH2-4.9 | 34 | 2 | 2 | Yes |
| CH2-4.10 | 35 | 2 | 1.9, 1.9 | Yes |
| CH2-4.10a | 100 | 2 | 2 | No |
| CH2-4.12 | 37 | 4 | 2.4 | Yes |
| CH2-4.13 | 38 | 4 | 0.27 | Yes |
| CH2-4.14 | 39 | 2 | 2 | Yes |
| CH2-4.15 | 40 | 2 | 0.30, 1.6 | Yes |
| CH2-4.16 | 41 | 2 | 1.9, 1.8 | Yes |
| CH2-4.16a | 101 | 2 | 1.9 | No |
| CH2-4.17 | 42 | 2 | 2 | No |
| CH2-4.18 | 43 | 4 | 2.1 | No |
| CH2-4.19 | 44 | 2 | 2, 2 | Yes |
| CH2-4.19a | 102 | 2 | 2 | No |
| CH2-4.20 | 45 | 2 | 1.9, 1.8 | Yes |
| CH2-4.20a | 103 | 2 | 1.9 | No |
| CH2-L6a | 51 | 2 | 0.85 | No |
| CH2-6.5 | 52 | 2 | 1.5 | No |
| CH2-6.6 | 53 | 2 | 1.5 | No |
| CH3-2.11 | 57 | 2 | 1.4, 1.5 | No |
| CH3-2.12 | 58 | 2 | 1.27 | No |
| CH3-3.8 | 63 | 2 | 0.7 | No |
| CH3-4.12 | 66 | 2 | 0.8 | No |
| CH3-4.14 | 68 | 2 | 1.3 | No |
| CK-2.12 | 73 | 2 or 4 | 0.2 | No |
| CK-2.14 | 75 | 2 or 4 | 0.1 | No |
| CK-L3C | 78 | 2 or 4 | 0.76 | No |
| CK-3.7 | 82 | 2 or 4 | 0.2 | No |
| CK-L5e | 92 | 2 or 4 | 0.26 | No |
| CK-5.15 | 93 | 2 or 4 | 0.8 | No |
| CK-5.16 | 94 | 2 | 0.2 | No |

For select antibodies with replacement sequences, we also examined the effect on DAR of having glycosylation present, by not making the Q295A and N297A mutations, thus leaving the wild-type N297A glycosylation site intact. The results are presented in Table G.

TABLE G

Glycosylated Antibodies Conjugated with Compound A by Transglutaminase

| Replacement Sequence Ref. | SEQ ID NO. | Maximum Theoretical DAR | DAR by MS |
|---|---|---|---|
| CH1-L5a | 24 | 2 | 1.88 |
| CH2-6.5 | 52 | 2 | 0.2 |
| CH2-6.6 | 53 | 2 | 0.28 |
| CH3-2.11 | 57 | 2 | 2 |
| CH1-1.7 | 9 | 2 | 1.84 |
| CH3-4.14 | 68 | 2 | 1.9 |
| CH3-2.12 | 58 | 2 | 0.86 |
| CH2-L6a | 51 | 2 | 0.42 |
| CH3-4.12 | 66 | 2 | 1.32 |
| CK-5.15 | 93 | 2 or 4 | 0.76 |
| CH1-L3c | 20 | 2 | 0.22 |
| CK-L3C | 20 | 2 | 0.72 |
| CH3-3.8 | 63 | 2 | 2 |
| CH1-L1c | 10 | 2 | 0.96 |

Example 3—Binding of Conjugates of Modified Antibodies to Cancer Cells

Anti-mesothelin antibody 6A4 modified with replacement sequences CH3-4.14, CH1-4.6, or CH3-2.11 were conjugated with Compound A. As an isotype control, a conjugate of an anti-CD70 antibody and Compound A was prepared. The anti-CD70 antibody had an N297A site specific substitution to obviate glycosylation and to free up nearby Q295 as a transamidation site.

Cell line and culture conditions. Human epithelial carcinoma cell lines H226, N87, and OVCAR3, and hamster ovarian cell line CHO-K1 were obtained from the American Type Culture Collection (ATCC, Rockville, MD). Cells were cultured in RPMI or DMEM (Gibco, USA) supplemented with 10% of FBS (Gibco, USA) under standard conditions (37° C. in humidified atmosphere containing 5% CO2). Cells were 80% of confluent at the time of assay. Concentration and viability were determined with a hemocytometer using the trypan-blue exclusion assay.

Surface binding antibody analysis. Independent serial dilutions of the test samples (final volume 50 μL) were prepared in duplicate in a 96-well plate using culture media with 1% FBS. Cells were detached with Cell Stripper Dissociation reagent (Corning). After washing with PBS, cells were incubated with serial dilution of the test sample for 1 hour at 25° C., then washed once with assay buffer by centrifugation. Cells were resuspended in detection reagent, PE-conjugated goat F(ab')2 anti-human IgG (Jackson ImmunoResearch), diluted 1:50 with assay buffer. The plate was incubated for 30 min. at 25° C., then washed once with assay buffer with centrifugation!n. Cells were resuspended in 80 μl assay buffer, and analyzed by CytoFLEX.

FIGS. 11A, 11B, and 11C compare the binding of the three conjugates (ADCs) to that of unconjugated antibody 6A4 to H226, OVCAR3, and N87 cells, respectively. These three cells lines express mesothelin but not CD70 on their cell surfaces. It can be seen from the figures that the binding of the three conjugates is virtually indistinguishable from that of unconjugated antibody 6A4. These results show that modification of the antibody with the replacement sequences does not affect its binding to its antigen. As expected, the isotype control with its anti-Cd70 antibody, did not bind to these cells.

Example 4—Cytotoxicity of Conjugates of Modified Antibodies

The in vitro cytotoxicity of the three conjugates of the preceding Example against N87, OVCAR3, and H226 cells was determined. All showed IC50's of less than 1 nM, indicating high potency. The results are shown in Table H.

TABLE H

Cytotoxicity of Conjugates

| Conjugate | | Cytotoxicity ($IC_{50}$, nM) | | |
|---|---|---|---|---|
| Structure | DAR | N87 Cells | OVCAR3 Cells | H226 Cells |
| CH3-2.11-Cpd A | 1.5 | 0.157 | 0.199 | 0.069 |
| CH1-4.6-Cpd A | 1.8 | 0.139 | 0.169 | 0.058 |
| CH3-4.14-Cpd A | 1.8 | 0.122 | 0.205 | 0.071 |

The In vitro cytotoxicity assay procedure was as follows: ADCs were evaluated for in vitro potency against N87, H226, OVCAR3, and CHO K1 cells (the latter as a negative control). Cells were plated in 100 μL of RPMI-1640 medium containing 10% FBS into 96-well flat-bottomed plates at $10^4$ cells/well (for N87, OVCAR3, and H226) and 100 μL cells/well (for CHO K1). Cells were allowed to adhere at 37° C. for 4 hours. A 3× concentration stock solution of each ADC was serially diluted by a 1:3 series and added to cells followed by 50 μl additional growth media after drug treatment. Treated cells were cultured at 37° C. for 7 days, and cell viability was assessed with the Cell Titer-Glo (CTG) Luminescent Viability Assay from Promega. 100 μL of reconstituted CTG reagent was added to each well with mild shaking for 10 min. Cytation 5 (Biotek Instruments) was used to read the luminescence. Percent cell viability was calculated by the following formula: (average luminescence of treated samples/average luminescence of untreated control samples)×100. $EC_{50}$ values were determined using logistic non-linear regression analysis with GraphPad Prism v7.02 software (La Jolla, CA, USA). The ADCs had no inhibitory effect on the proliferation of the CHO K1 cells, which do not express mesothelin.

Example 5—Stability of Conjugates of Modified Antibodies

The tubulysin analog that serves as the anti-cancer drug agent of Compound A has an acetate group (see dotted box in structural formula above). Its loss by hydrolysis (Deacetylation) causes the tubulysin analog to lose its cytotoxicity.

The stability of conjugates made with anti-mesothelin antibody 6A4 having a replacement sequence as disclosed herein was compared to that of the same antibody not having a replacement sequence. Two parameters were measured: (a) rate of deacetylation and (b) resistance to thermally induced dissociation of the antibody, as measured by differential scanning calorimetry (DSC). The results are shown in Table I.

TABLE I

Stability of Conjugates

| | De-Acetylation (%) | | | Dissociation Temperature (Onset, ° C.) | |
|---|---|---|---|---|---|
| Antibody or Conjugate | Day 1 | Day 2 | Day 3 | Before conjugation | After Conjugation |
| 6A4, unconjugated | NA | NA | NA | 64.5 | NA |
| (6A4 N297A)-(Cpd A) | 1.35 | 3.01 | 9.85 | 51.8 | 53.9 |
| (CH2-4.16)-(Cpd A) | 4.03 | 8.48 | 21.65 | 62.7 | 59.7 |
| (CH2-4.16a)-(Cpd A) | 3.6 | 7.92 | 32.39 | 56.4 | 56.8 |
| (CH2-4.10)-(Cpd A) | 2.41 | 5.11 | 16.44 | 58 | 55.7 |
| (CH2-4.10a)-(Cpd A) | 2.73 | 6.63 | 24.68 | 58.9 | 60.5 |
| (CH2-4.19)-(Cpd A) | 2.23 | 4.23 | 14.86 | 57 | 53.9 |
| (CH2-4.19a)-(Cpd A) | 1.71 | 3.31 | 12.64 | 52.2 | 53.7 |
| (CH2-4.20)-(Cpd A) | 8.06 | 16.48 | 51.18 | 60.8 | 56.6 |
| (CH2-4.20a)-(Cpd A) | 1.72 | 3.56 | 12.27 | 54 | 58.4 |
| (CH2-4.15)-(Cpd A) | 6.34 | 11.62 | 33.15 | 64.4 | 61.8 |
| (CH2-4.17)-(Cpd A) | n.d. | n.d. | n.d. | 59.43 | 59.7 |

The deacetylation of the tubulysin analog in ADCs in SCID mouse serum was measured as follows: ADCs were diluted to a target concentration of 50 μg/ml in 500 μL SCID mouse serum and incubated at 37° C. From the incubating sample plate, 80 μl of serum samples were collected and immediately frozen on days 0, 1, 2 and 5. All the ADCs were extracted from serum using "mono-affinity" or "dual-affinity" capture methods and analyzed by LC-HRMS. In brief, the ADCs were captured from serum using a generic anti-human F(ab')$_2$ reagent. For LC-conjugated ADC (LC C-term), ADC was eluted from the beads, followed by separation of LC and HC via reduction of inter-chain disulfide bonds. For HC-Fab conjugated ADC (S190), the immobilized ADC was digested "on-bead" with IdeS enzyme, followed by elution of F(ab')$_2$ and inter-chain disulfide reduction to separate LC and Fd'. In the case of HC-Fc conjugated ADCs (Q295, Q418, G385, HC C-term), the captured ADCs were digested with IdeS (aglycosylated ADCs) or IdeS+PNGase F (N-glcyan ADCs) to release the deglycosylated Fc fragment. The beads were discarded and the Fc present in the digestion mixture is further captured by addition of a second set of beads coated with anti-human Fc capture reagent.

The foregoing detailed description of the invention includes passages that are chiefly or exclusively concerned with particular parts or aspects of the invention. It is to be understood that this is for clarity and convenience, that a particular feature may be relevant in more than just the passage in which it is disclosed, and that the disclosure herein includes all the appropriate combinations of information found in the different passages. Similarly, although the various figures and descriptions herein relate to specific embodiments of the invention, it is to be understood that where a specific feature is disclosed in the context of a particular figure or embodiment, such feature can also be used, to the extent appropriate, in the context of another figure or embodiment, in combination with another feature, or in the invention in general.

Further, while the present invention has been particularly described in terms of certain preferred embodiments, the invention is not limited to such preferred embodiments. Rather, the scope of the invention is defined by the appended claims.

REFERENCES

Full citations for the following references cited in abbreviated fashion by first author (or inventor) and date earlier in this specification are provided below. Each of these references is incorporated herein by reference for all purposes.

Ando et al., *Agri. Biol. Chem.* 1989, 53, 2613, "Purification and Characteristics of a Novel Transglutaminase Derived from Microorganisms."
Bregeon, US 2016/0114056 A1 (2016).
Bregeon et al., U.S. Pat. No. 9,427,478 B2 (2016).
Bregeon et al., U.S. Pat. No. 9,717,803 B2 (2017).
Chen et al., US 2005/0136491 A1 (2005).
Dennler et al., *Bioconjug. Chem.* 2014, 25, 569, "Transglutaminase-Based Chemo-Enzymatic Conjugation Approach Yields Homogeneous Antibody-Drug Conjugates."
Farias et al., US 2016/0193356 A1 (2016).
Fischer et al., US 2015/0284713 A1 (2015).
Fontana et al., *Adv. Drug Deliv. Rev.* 2008, 60, 13, "Site-Specific modification and PEGylation of pharmaceutical proteins mediated by transglutaminase."
Gerber et al., *Nat. Prod. Rep.* 2013, 30, 625, "The antibody-drug conjugate: an enabling modality for natural product-based cancer therapies."
Innate Pharma, "A New Site Specific Antibody Conjugation Using Bacterial Transglutaminase," presentation at ADC Summit, San Francisco, California, Oct. 15, 2013.
Jeger et al., *Angew. Chem. Int. Ed.* 2010, 49, 9995, "Site-Specific and Stoichiometric Modification of Antibodies by Bacterial Transglutaminase."
Kamiya et al., US 2011/0184147 A1 (2011).
Lin et al., *J. Am. Chem. Soc.* 2006, 128, 4542, "Transglutaminase-Catalyzed Site-Specific Conjugation of Small-Molecule Probes to Proteins in Vitro and on the Surface of Living Cells."
Mero et al., *Bioconjug. Chem.* 2009, 20, 384, "Transglutaminase-Mediated PEGylation of Proteins: Direct Identification of the Sites of Protein Modification by Mass Spectrometry Using a Novel Monodisperse PEG."
Mindt et al., *Bioconjug. Chem.* 2008, 19, 271, "Modification of Different IgG1 Antibodies via Glutamine and Lysine using Bacterial and Human Tissue Transglutaminase."
Ohtsuka et al., *Biosci. Biotechnol. Biochem.* 2000, 64, 2608, "Comparison of Substrate Specificities of Transglutaminases Using Synthetic Peptides as Acyl Donors."
Rao-Naik et al., WO 2017/059158 A1 (2017).
Rao-Naik et al., US 2018/0037921 A1 (2018).
Sato, *Adv. Drug Deliv. Rev.* 2002, 54, 487, "Enzymatic procedure for site-specific pegylation of proteins."
Sato et al., U.S. Pat. No. 6,322,996 B1 (2001).
Schibli et al., US 2007/0184537 A1 (2007).
Smith et al., US 2019/0099505 A1 (2019).
Strop et al., *Chemistry & Biology* 2013, 20, 161, "Location Matters: Site of Conjugation Modulates Stability and Pharmacokinetics of Antibody Drug Conjugates."
Strop et al., U.S. Pat. No. 9,676,871 B2 (2017).
Sugimura et al., *J. Biotechnol.* 2007, 131, 121, "Novel site-specific immobilization of a functional protein using a preferred substrate sequence for transglutaminase 2."

What is claimed is:

1. A full-length IgG antibody, having a modification selected from the group consisting of:
   (i) replacement of the amino acids at EU 131 through 135 of a heavy chain with the amino acids of SEQ ID NO:7, SEQ ID NO:8, and SEQ ID NO: 9 or SEQ ID NO: 10;
   (ii) replacement of the amino acids at EU 160 through 164 of a heavy chain with the amino acids of SEQ ID NO: 11, SEQ ID NO: 12, SEQ ID NO: 13, SEQ ID NO: 14, SEQ ID NO: 16, or SEQ ID NO:17;
   (iii) replacement of the amino acids at EU 175 through 177 of a heavy chain with the amino acids of SEQ ID NO: 18, SEQ ID NO: 19, or NO: 20;
   (iv) replacement of the amino acids at EU 190 through 196 of a heavy chain with the amino acids of SEQ ID NO:22, SEQ ID NO:23, or SEQ ID NO:24;
   (v) replacement of the amino acids at EU 264 through 269 of a heavy chain with the amino acids of SEQ ID NO:25, SEQ ID NO:26, SEQ ID NO:27 or SEQ NO: 28;
   (vi) replacement of the amino acids at EU 280 through 284 of a heavy chain with the amino acids of SEQ ID NO:29, SEQ ID NO:30, or SEQ ID NO:31;
   (vii) replacement of the amino acids at EU 292 through 297 of a heavy chain with the amino acids of SEQ ID NO:33, SEQ ID NO:34, SEQ ID NO:35, SEQ ID NO:36, SEQ ID NO: 37, SEQ ID NO: 38, SEQ ID NO:39, SEQ ID NO:40, SEQ ID NO:41, SEQ ID NO:42, SEQ ID NO: 43, SEQ ID NO:44, SEQ ID NO:45, SEQ ID NO:47, SEQ ID NO: 100, SEQ ID NO: 101, SEQ ID NO: 102, or SEQ ID NO: 103;

(viii) replacement of the amino acids at EU 314 through 319 of a heavy chain with the amino acids of SEQ ID NO:48, SEQ ID NO:49 or SEQ ID NO:50;
(ix) replacement of the amino acids at EU 330 through 331 of a heavy chain with the amino acids of SEQ ID NO:51, SEQ ID NO:52, or SEQ ID NO:53;
(x) replacement of the amino acids at EU 358 through 362 of a heavy chain with the amino acids of SEQ ID NO:54 or SEQ ID NO:55;
(xi) replacement of the amino acids at EU 384 through 402 of a heavy chain with the amino acids of SEQ ID NO:56, SEQ ID NO:57, SEQ ID NO:58, SEQ ID NO:59, SEQ ID NO:60, SEQ ID NO: 61, SEQ ID NO: 62, SEQ ID NO:63 or SEQ ID NO:64;
(xii) replacement of the amino acids at EU 414 through 419 of a heavy chain with the amino acids of SEQ ID NO: 65, SEQ ID NO:66, SEQ ID NO:67, SEQ ID NO:68, or SEQ ID NO:69;
(xiii) replacement of the amino acids at EU 122 through 126 of a light chain with the amino acids of SEQ ID NO:70, SEQ ID NO:71, or SEQ ID NO:72;
(xiv) replacement of the amino acids at EU 152 through 155 of a light chain with the amino acids of SEQ ID NO:73, SEQ ID NO:74, or SEQ ID NO:75;
(xv) replacement of the amino acids at EU 167 through 170 of a light chain with the amino acids of SEQ ID NO:76, SEQ ID NO: 77, SEQ ID NO:78, SEQ ID NO: 79, SEQ ID NO:81, or SEQ ID NO:82;
(xvi) replacement of the amino acids at EU 182 through 190 of a light chain with the amino acids of SEQ ID NO: 83, SEQ ID NO: 84, SEQ ID NO: 85, SEQ ID NO: 86, or SEQ ID NO:87; and
(xvii) replacement of the amino acids at EU 199 through 204 of a light chain with the amino acids of SEQ ID NO: 89, SEQ ID NO: 90, SEQ ID NO: 91, SEQ ID NO:92, SEQ ID NO: 93, SEQ ID NO:94, SEQ ID NO: 95, or SEQ ID NO:96.

2. The antibody of claim 1, which is an IgG1 antibody.

3. The antibody of claim 2, wherein the modification is in a heavy chain.

4. The antibody of claim 2, wherein the modification is selected from the group consisting of:

(I) replacement of the amino acids at EU 131 through 135 of a heavy chain with the amino acids of SEQ ID NO:9 or SEQ ID NO: 10;
(II) replacement of the amino acids at EU 175 through 177 of a heavy chain with the amino acids of SEQ ID NO: 18;
(III) replacement of the amino acids at EU 190 through 196 of a heavy chain with the amino acids of SEQ ID NO:22;
(IV) replacement of the amino acids at EU 264 through 269 of a heavy chain with the amino acids of SEQ ID NO:27 or SEQ ID NO:28;
(V) replacement of the amino acids at EU 292 through 297 of a heavy chain with the amino acids of SEQ ID NO:34, SEQ ID NO:35, SEQ ID NO:37, SEQ ID NO:38, SEQ ID NO:39, SEQ ID NO: 40, SEQ ID NO:41, SEQ ID NO:42, SEQ ID NO:43, SEQ ID NO:44, SEQ ID NO:45, SEQ ID NO: 100, SEQ ID NO: 101, SEQ ID NO: 102, or SEQ ID NO: 103;
(VI) replacement of the amino acids at EU 330 through 331 of a heavy chain with the amino acids of SEQ ID NO: 51, SEQ ID NO:52 or SEQ ID NO:53;
(VII) replacement of the amino acids at EU 384 through 402 of a heavy chain with the amino acids of SEQ ID NO:57, SEQ ID NO:58, or SEQ ID NO:63;
(VIII) replacement of the amino acids at EU 414 through 419 of a heavy chain with the amino acids of SEQ ID NO:66 or SEQ ID NO:68;
(IX) replacement of the amino acids at EU 152 through 155 of a light chain with the amino acids of SEQ ID NO:73 or SEQ ID NO:75;
(X) replacement of the amino acids at EU 167 through 170 of a light chain with the amino acids of SEQ ID NO: 78 or SEQ ID NO:82; and
(XI) replacement of the amino acids at EU 199 through 204 of a light chain with the amino acids of SEQ ID NO: 92, SEQ ID NO: 93 or SEQ ID NO:94.

5. The antibody of claim 2, wherein the replacement sequence comprises the tripeptide -VLQ-.

* * * * *

SEQUENCE LISTING

```
<160> NUMBER OF SEQ ID NOS: 103

<210> SEQ ID NO 1
<211> LENGTH: 330
<212> TYPE: PRT
<213> ORGANISM: Homo sapiens
<220> FEATURE:
<221> NAME/KEY: MISC_FEATURE
<223> OTHER INFORMATION: Human IgG1 Heavy Chain Constant Region

<400> SEQUENCE: 1

Ala Ser Thr Lys Gly Pro Ser Val Phe Pro Leu Ala Pro Ser Ser Lys
1               5                   10                  15

Ser Thr Ser Gly Gly Thr Ala Ala Leu Gly Cys Leu Val Lys Asp Tyr
            20                  25                  30

Phe Pro Glu Pro Val Thr Val Ser Trp Asn Ser Gly Ala Leu Thr Ser
        35                  40                  45

Gly Val His Thr Phe Pro Ala Val Leu Gln Ser Ser Gly Leu Tyr Ser
    50                  55                  60

Leu Ser Ser Val Val Thr Val Pro Ser Ser Ser Leu Gly Thr Gln Thr
```

```
                65                  70                  75                  80
Tyr Ile Cys Asn Val Asn His Lys Pro Ser Asn Thr Lys Val Asp Lys
                    85                  90                  95
Arg Val Glu Pro Lys Ser Cys Asp Lys Thr His Thr Cys Pro Pro Cys
                    100                 105                 110
Pro Ala Pro Glu Leu Leu Gly Gly Pro Ser Val Phe Leu Phe Pro Pro
                    115                 120                 125
Lys Pro Lys Asp Thr Leu Met Ile Ser Arg Thr Pro Glu Val Thr Cys
                    130                 135                 140
Val Val Val Asp Val Ser His Glu Asp Pro Glu Val Lys Phe Asn Trp
145                 150                 155                 160
Tyr Val Asp Gly Val Glu Val His Asn Ala Lys Thr Lys Pro Arg Glu
                    165                 170                 175
Glu Gln Tyr Asn Ser Thr Tyr Arg Val Val Ser Val Leu Thr Val Leu
                    180                 185                 190
His Gln Asp Trp Leu Asn Gly Lys Glu Tyr Lys Cys Lys Val Ser Asn
                    195                 200                 205
Lys Ala Leu Pro Ala Pro Ile Glu Lys Thr Ile Ser Lys Ala Lys Gly
                    210                 215                 220
Gln Pro Arg Glu Pro Gln Val Tyr Thr Leu Pro Pro Ser Arg Glu Glu
225                 230                 235                 240
Met Thr Lys Asn Gln Val Ser Leu Thr Cys Leu Val Lys Gly Phe Tyr
                    245                 250                 255
Pro Ser Asp Ile Ala Val Glu Trp Glu Ser Asn Gly Gln Pro Glu Asn
                    260                 265                 270
Asn Tyr Lys Thr Thr Pro Pro Val Leu Asp Ser Asp Gly Ser Phe Phe
                    275                 280                 285
Leu Tyr Ser Lys Leu Thr Val Asp Lys Ser Arg Trp Gln Gln Gly Asn
                    290                 295                 300
Val Phe Ser Cys Ser Val Met His Glu Ala Leu His Asn His Tyr Thr
305                 310                 315                 320
Gln Lys Ser Leu Ser Leu Ser Pro Gly Lys
                    325                 330

<210> SEQ ID NO 2
<211> LENGTH: 326
<212> TYPE: PRT
<213> ORGANISM: Homo sapiens
<220> FEATURE:
<221> NAME/KEY: MISC_FEATURE
<223> OTHER INFORMATION: Human IgG2 Heavy Chain Constant Region

<400> SEQUENCE: 2

Ala Ser Thr Lys Gly Pro Ser Val Phe Pro Leu Ala Pro Cys Ser Arg
1               5                   10                  15
Ser Thr Ser Glu Ser Thr Ala Ala Leu Gly Cys Leu Val Lys Asp Tyr
                    20                  25                  30
Phe Pro Glu Pro Val Thr Val Ser Trp Asn Ser Gly Ala Leu Thr Ser
                    35                  40                  45
Gly Val His Thr Phe Pro Ala Val Leu Gln Ser Ser Gly Leu Tyr Ser
                    50                  55                  60
Leu Ser Ser Val Val Thr Val Pro Ser Ser Asn Phe Gly Thr Gln Thr
65                  70                  75                  80
Tyr Thr Cys Asn Val Asp His Lys Pro Ser Asn Thr Lys Val Asp Lys
                    85                  90                  95
```

```
Thr Val Glu Arg Lys Cys Cys Val Glu Cys Pro Pro Cys Pro Ala Pro
            100                 105                 110

Pro Val Ala Gly Pro Ser Val Phe Leu Phe Pro Pro Lys Pro Lys Asp
        115                 120                 125

Thr Leu Met Ile Ser Arg Thr Pro Glu Val Thr Cys Val Val Val Asp
    130                 135                 140

Val Ser His Glu Asp Pro Glu Val Gln Phe Asn Trp Tyr Val Asp Gly
145                 150                 155                 160

Val Glu Val His Asn Ala Lys Thr Lys Pro Arg Glu Glu Gln Phe Asn
                165                 170                 175

Ser Thr Phe Arg Val Val Ser Val Leu Thr Val His Gln Asp Trp
            180                 185                 190

Leu Asn Gly Lys Glu Tyr Lys Cys Lys Val Ser Asn Lys Gly Leu Pro
        195                 200                 205

Ala Pro Ile Glu Lys Thr Ile Ser Lys Thr Lys Gly Gln Pro Arg Glu
    210                 215                 220

Pro Gln Val Tyr Thr Leu Pro Pro Ser Arg Glu Glu Met Thr Lys Asn
225                 230                 235                 240

Gln Val Ser Leu Thr Cys Leu Val Lys Gly Phe Tyr Pro Ser Asp Ile
                245                 250                 255

Ser Val Glu Trp Glu Ser Asn Gly Gln Pro Glu Asn Asn Tyr Lys Thr
            260                 265                 270

Thr Pro Pro Met Leu Asp Ser Asp Gly Ser Phe Phe Leu Tyr Ser Lys
        275                 280                 285

Leu Thr Val Asp Lys Ser Arg Trp Gln Gln Gly Asn Val Phe Ser Cys
    290                 295                 300

Ser Val Met His Glu Ala Leu His Asn His Tyr Thr Gln Lys Ser Leu
305                 310                 315                 320

Ser Leu Ser Pro Gly Lys
                325

<210> SEQ ID NO 3
<211> LENGTH: 377
<212> TYPE: PRT
<213> ORGANISM: Homo sapiens
<220> FEATURE:
<221> NAME/KEY: MISC_FEATURE
<223> OTHER INFORMATION: Human IgG2 Heavy Chain Constant Region

<400> SEQUENCE: 3

Ala Ser Thr Lys Gly Pro Ser Val Phe Pro Leu Ala Pro Cys Ser Arg
1               5                   10                  15

Ser Thr Ser Gly Gly Thr Ala Ala Leu Gly Cys Leu Val Lys Asp Tyr
            20                  25                  30

Phe Pro Glu Pro Val Thr Val Ser Trp Asn Ser Gly Ala Leu Thr Ser
        35                  40                  45

Gly Val His Thr Phe Pro Ala Val Leu Gln Ser Ser Gly Leu Tyr Ser
    50                  55                  60

Leu Ser Ser Val Val Thr Val Pro Ser Ser Ser Leu Gly Thr Gln Thr
65                  70                  75                  80

Tyr Thr Cys Asn Val Asn His Lys Pro Ser Asn Thr Lys Val Asp Lys
                85                  90                  95

Arg Val Glu Leu Lys Thr Pro Leu Gly Asp Thr Thr His Thr Cys Pro
            100                 105                 110

Arg Cys Pro Glu Pro Lys Ser Cys Asp Thr Pro Pro Pro Cys Pro Arg
        115                 120                 125
```

```
Cys Pro Glu Pro Lys Ser Cys Asp Thr Pro Pro Cys Pro Arg Cys
    130                 135                 140

Pro Glu Pro Lys Ser Cys Asp Thr Pro Pro Cys Pro Arg Cys Pro
145                 150                 155                 160

Ala Pro Glu Leu Leu Gly Gly Pro Ser Val Phe Leu Phe Pro Lys
                165                 170                 175

Pro Lys Asp Thr Leu Met Ile Ser Arg Thr Pro Glu Val Thr Cys Val
            180                 185                 190

Val Val Asp Val Ser His Glu Asp Pro Glu Val Gln Phe Lys Trp Tyr
        195                 200                 205

Val Asp Gly Val Glu Val His Asn Ala Lys Thr Lys Pro Arg Glu Glu
    210                 215                 220

Gln Tyr Asn Ser Thr Phe Arg Val Val Ser Val Leu Thr Val Leu His
225                 230                 235                 240

Gln Asp Trp Leu Asn Gly Lys Glu Tyr Lys Cys Lys Val Ser Asn Lys
                245                 250                 255

Ala Leu Pro Ala Pro Ile Glu Lys Thr Ile Ser Lys Thr Lys Gly Gln
                260                 265                 270

Pro Arg Glu Pro Gln Val Tyr Thr Leu Pro Pro Ser Arg Glu Glu Met
        275                 280                 285

Thr Lys Asn Gln Val Ser Leu Thr Cys Leu Val Lys Gly Phe Tyr Pro
    290                 295                 300

Ser Asp Ile Ala Val Glu Trp Glu Ser Ser Gly Gln Pro Glu Asn Asn
305                 310                 315                 320

Tyr Asn Thr Thr Pro Pro Met Leu Asp Ser Asp Gly Ser Phe Phe Leu
                325                 330                 335

Tyr Ser Lys Leu Thr Val Asp Lys Ser Arg Trp Gln Gln Gly Asn Ile
                340                 345                 350

Phe Ser Cys Ser Val Met His Glu Ala Leu His Asn Arg Phe Thr Gln
            355                 360                 365

Lys Ser Leu Ser Leu Ser Pro Gly Lys
    370                 375

<210> SEQ ID NO 4
<211> LENGTH: 327
<212> TYPE: PRT
<213> ORGANISM: Homo sapiens
<220> FEATURE:
<221> NAME/KEY: MISC_FEATURE
<223> OTHER INFORMATION: Human IgG4 Heavy Chain Constant Region

<400> SEQUENCE: 4

Ala Ser Thr Lys Gly Pro Ser Val Phe Pro Leu Ala Pro Cys Ser Arg
1               5                   10                  15

Ser Thr Ser Glu Ser Thr Ala Ala Leu Gly Cys Leu Val Lys Asp Tyr
            20                  25                  30

Phe Pro Glu Pro Val Thr Val Ser Trp Asn Ser Gly Ala Leu Thr Ser
        35                  40                  45

Gly Val His Thr Phe Pro Ala Val Leu Gln Ser Ser Gly Leu Tyr Ser
    50                  55                  60

Leu Ser Ser Val Val Thr Val Pro Ser Ser Ser Leu Gly Thr Lys Thr
65                  70                  75                  80

Tyr Thr Cys Asn Val Asp His Lys Pro Ser Asn Thr Lys Val Asp Lys
                85                  90                  95

Arg Val Glu Ser Lys Tyr Gly Pro Pro Cys Pro Ser Cys Pro Ala Pro
```

```
                    100                 105                 110
Glu Phe Leu Gly Gly Pro Ser Val Phe Leu Phe Pro Pro Lys Pro Lys
            115                 120                 125

Asp Thr Leu Met Ile Ser Arg Thr Pro Glu Val Thr Cys Val Val Val
130                 135                 140

Asp Val Ser Gln Glu Asp Pro Glu Val Gln Phe Asn Trp Tyr Val Asp
145                 150                 155                 160

Gly Val Glu Val His Asn Ala Lys Thr Lys Pro Arg Glu Glu Gln Phe
                165                 170                 175

Asn Ser Thr Tyr Arg Val Val Ser Val Leu Thr Val Leu His Gln Asp
            180                 185                 190

Trp Leu Asn Gly Lys Glu Tyr Lys Cys Lys Val Ser Asn Lys Gly Leu
        195                 200                 205

Pro Ser Ser Ile Glu Lys Thr Ile Ser Lys Ala Lys Gly Gln Pro Arg
    210                 215                 220

Glu Pro Gln Val Tyr Thr Leu Pro Pro Ser Gln Glu Glu Met Thr Lys
225                 230                 235                 240

Asn Gln Val Ser Leu Thr Cys Leu Val Lys Gly Phe Tyr Pro Ser Asp
                245                 250                 255

Ile Ala Val Glu Trp Glu Ser Asn Gly Gln Pro Glu Asn Asn Tyr Lys
            260                 265                 270

Thr Thr Pro Pro Val Leu Asp Ser Asp Gly Ser Phe Phe Leu Tyr Ser
        275                 280                 285

Arg Leu Thr Val Asp Lys Ser Arg Trp Gln Glu Gly Asn Val Phe Ser
    290                 295                 300

Cys Ser Val Met His Glu Ala Leu His Asn His Tyr Thr Gln Lys Ser
305                 310                 315                 320

Leu Ser Leu Ser Leu Gly Lys
                325

<210> SEQ ID NO 5
<211> LENGTH: 107
<212> TYPE: PRT
<213> ORGANISM: Homo sapiens
<220> FEATURE:
<221> NAME/KEY: MISC_FEATURE
<223> OTHER INFORMATION: Human Kappa Light Chain Constant Region

<400> SEQUENCE: 5

Arg Thr Val Ala Ala Pro Ser Val Phe Ile Phe Pro Pro Ser Asp Glu
1               5                   10                  15

Gln Leu Lys Ser Gly Thr Ala Ser Val Val Cys Leu Leu Asn Asn Phe
            20                  25                  30

Tyr Pro Arg Glu Ala Lys Val Gln Trp Lys Val Asp Asn Ala Leu Gln
        35                  40                  45

Ser Gly Asn Ser Gln Glu Ser Val Thr Glu Gln Asp Ser Lys Asp Ser
    50                  55                  60

Thr Tyr Ser Leu Ser Ser Thr Leu Thr Leu Ser Lys Ala Asp Tyr Glu
65                  70                  75                  80

Lys His Lys Val Tyr Ala Cys Glu Val Thr His Gln Gly Leu Ser Ser
                85                  90                  95

Pro Val Thr Lys Ser Phe Asn Arg Gly Glu Cys
            100                 105

<210> SEQ ID NO 6
<211> LENGTH: 106
```

```
<212> TYPE: PRT
<213> ORGANISM: Homo sapiens
<220> FEATURE:
<221> NAME/KEY: MISC_FEATURE
<223> OTHER INFORMATION: Human Lambda Light Chain Constant Region

<400> SEQUENCE: 6

Gly Gln Pro Lys Ala Asn Pro Thr Val Thr Leu Phe Pro Pro Ser Ser
1               5                   10                  15

Glu Glu Leu Gln Ala Asn Lys Ala Thr Leu Val Cys Leu Ile Ser Asp
            20                  25                  30

Phe Tyr Pro Gly Ala Val Thr Val Ala Trp Lys Ala Asp Gly Ser Pro
        35                  40                  45

Val Lys Ala Gly Val Glu Thr Thr Lys Pro Ser Lys Gln Ser Asn Asn
    50                  55                  60

Lys Tyr Ala Ala Ser Ser Tyr Leu Ser Leu Thr Pro Glu Gln Trp Lys
65                  70                  75                  80

Ser His Arg Ser Tyr Ser Cys Gln Val Thr His Glu Gly Ser Thr Val
                85                  90                  95

Glu Lys Thr Val Ala Pro Thr Glu Cys Ser
            100                 105

<210> SEQ ID NO 7
<211> LENGTH: 5
<212> TYPE: PRT
<213> ORGANISM: Artificial Sequence
<220> FEATURE:
<223> OTHER INFORMATION: CH1 Loop 1 Replacement Sequence

<400> SEQUENCE: 7

Val Leu Gln Tyr Ala
1               5

<210> SEQ ID NO 8
<211> LENGTH: 9
<212> TYPE: PRT
<213> ORGANISM: Artificial Sequence
<220> FEATURE:
<223> OTHER INFORMATION: CH1 Loop 1 Replacement Sequence

<400> SEQUENCE: 8

Ser Ser Val Leu Gln Tyr Ala Ser Thr
1               5

<210> SEQ ID NO 9
<211> LENGTH: 9
<212> TYPE: PRT
<213> ORGANISM: Artificial Sequence
<220> FEATURE:
<223> OTHER INFORMATION: CH1 Loop 1 Replacement Sequence

<400> SEQUENCE: 9

Ser Ser Lys Ser Val Leu Gln Tyr Thr
1               5

<210> SEQ ID NO 10
<211> LENGTH: 8
<212> TYPE: PRT
<213> ORGANISM: Artificial Sequence
<220> FEATURE:
<223> OTHER INFORMATION: CH1 Loop 1 Replacement Sequence

<400> SEQUENCE: 10

Ser Ser Lys Ser Leu Gln Tyr Thr
```

```
1               5

<210> SEQ ID NO 11
<211> LENGTH: 6
<212> TYPE: PRT
<213> ORGANISM: Artificial Sequence
<220> FEATURE:
<223> OTHER INFORMATION: CH1 Loop 2 Replacement Sequence

<400> SEQUENCE: 11

Ser Gly Ala Leu Gln Thr
1               5

<210> SEQ ID NO 12
<211> LENGTH: 7
<212> TYPE: PRT
<213> ORGANISM: Artificial Sequence
<220> FEATURE:
<223> OTHER INFORMATION: CH1 Loop 2 Replacement Sequence

<400> SEQUENCE: 12

Ser Gly Ala Val Leu Gln Thr
1               5

<210> SEQ ID NO 13
<211> LENGTH: 5
<212> TYPE: PRT
<213> ORGANISM: Artificial Sequence
<220> FEATURE:
<223> OTHER INFORMATION: CH1 Loop 2 Replacement Sequence

<400> SEQUENCE: 13

Ser Gly Ala Leu Gln
1               5

<210> SEQ ID NO 14
<211> LENGTH: 7
<212> TYPE: PRT
<213> ORGANISM: Artificial Sequence
<220> FEATURE:
<223> OTHER INFORMATION: CH1 Loop 2 Replacement Sequence

<400> SEQUENCE: 14

Ser Gly Val Leu Gln Tyr Ala
1               5

<210> SEQ ID NO 15

<400> SEQUENCE: 15

000

<210> SEQ ID NO 16
<211> LENGTH: 9
<212> TYPE: PRT
<213> ORGANISM: Artificial Sequence
<220> FEATURE:
<223> OTHER INFORMATION: CH1 Loop 2 Replacement Sequence

<400> SEQUENCE: 16

Val Leu Gln Tyr Ser Gly Ala Leu Thr
1               5

<210> SEQ ID NO 17
<211> LENGTH: 8
<212> TYPE: PRT
<213> ORGANISM: Artificial Sequence
```

```
<220> FEATURE:
<223> OTHER INFORMATION: CH1 Loop 2 Replacement Sequence

<400> SEQUENCE: 17

Leu Gln Tyr Ser Gly Ala Leu Thr
1               5

<210> SEQ ID NO 18
<211> LENGTH: 4
<212> TYPE: PRT
<213> ORGANISM: Artificial Sequence
<220> FEATURE:
<223> OTHER INFORMATION: CH1 Loop 3 Replacement Sequence
<220> FEATURE:
<221> NAME/KEY: MISC_FEATURE
<222> LOCATION: (4)..(4)
<223> OTHER INFORMATION: Xaa is absent

<400> SEQUENCE: 18

Val Leu Gln Xaa
1

<210> SEQ ID NO 19
<211> LENGTH: 6
<212> TYPE: PRT
<213> ORGANISM: Artificial Sequence
<220> FEATURE:
<223> OTHER INFORMATION: CH1 Loop 3 Replacement Sequence

<400> SEQUENCE: 19

Val Leu Gln Tyr Ala Ser
1               5

<210> SEQ ID NO 20
<211> LENGTH: 7
<212> TYPE: PRT
<213> ORGANISM: Artificial Sequence
<220> FEATURE:
<223> OTHER INFORMATION: CH1 Loop 3 Replacement Sequence

<400> SEQUENCE: 20

Ser Val Leu Gln Tyr Ala Ser
1               5

<210> SEQ ID NO 21

<400> SEQUENCE: 21

000

<210> SEQ ID NO 22
<211> LENGTH: 8
<212> TYPE: PRT
<213> ORGANISM: Artificial Sequence
<220> FEATURE:
<223> OTHER INFORMATION: CH1 Loop 4 Replacement Sequence

<400> SEQUENCE: 22

Val Leu Gln Tyr Leu Gly Thr Gln
1               5

<210> SEQ ID NO 23
<211> LENGTH: 7
<212> TYPE: PRT
<213> ORGANISM: Artificial Sequence
<220> FEATURE:
<223> OTHER INFORMATION: CH1 Loop 4 Replacement Sequence
```

```
<400> SEQUENCE: 23

Leu Gln Tyr Leu Gly Thr Gln
1               5

<210> SEQ ID NO 24
<211> LENGTH: 7
<212> TYPE: PRT
<213> ORGANISM: Artificial Sequence
<220> FEATURE:
<223> OTHER INFORMATION: CH1 Loop 5 Replacement Sequence

<400> SEQUENCE: 24

Pro Val Leu Gln Tyr Ala Ser
1               5

<210> SEQ ID NO 25
<211> LENGTH: 6
<212> TYPE: PRT
<213> ORGANISM: Artificial Sequence
<220> FEATURE:
<223> OTHER INFORMATION: CH2 Loop 2 Replacement Sequence

<400> SEQUENCE: 25

Leu Gln Val Ser His Glu
1               5

<210> SEQ ID NO 26
<211> LENGTH: 6
<212> TYPE: PRT
<213> ORGANISM: Artificial Sequence
<220> FEATURE:
<223> OTHER INFORMATION: CH2 Loop 2 Replacement Sequence

<400> SEQUENCE: 26

Leu Gln Tyr Ala His Glu
1               5

<210> SEQ ID NO 27
<211> LENGTH: 10
<212> TYPE: PRT
<213> ORGANISM: Artificial Sequence
<220> FEATURE:
<223> OTHER INFORMATION: CH2 Loop 2 Replacement Sequence

<400> SEQUENCE: 27

Val Asp Val Ser His Val Leu Gln Tyr Ala
1               5                   10

<210> SEQ ID NO 28
<211> LENGTH: 9
<212> TYPE: PRT
<213> ORGANISM: Artificial Sequence
<220> FEATURE:
<223> OTHER INFORMATION: CH2 Loop 2 Replacement Sequence

<400> SEQUENCE: 28

Val Asp Val Ser His Val Leu Gln Tyr
1               5

<210> SEQ ID NO 29
<211> LENGTH: 7
<212> TYPE: PRT
<213> ORGANISM: Artificial Sequence
<220> FEATURE:
<223> OTHER INFORMATION: CH2 Loop 3 Replacement Sequence

<400> SEQUENCE: 29
```

```
Val Leu Gln Tyr Ala Glu Val
1               5
```

<210> SEQ ID NO 30
<211> LENGTH: 9
<212> TYPE: PRT
<213> ORGANISM: Artificial Sequence
<220> FEATURE:
<223> OTHER INFORMATION: CH2 Loop 3 Replacement Sequence

<400> SEQUENCE: 30

```
Asp Gly Val Leu Gln Tyr Ala Glu Val
1               5
```

<210> SEQ ID NO 31
<211> LENGTH: 7
<212> TYPE: PRT
<213> ORGANISM: Artificial Sequence
<220> FEATURE:
<223> OTHER INFORMATION: CH2 Loop 3 Replacement Sequence

<400> SEQUENCE: 31

```
Asp Gly Val Leu Gln Tyr Ala
1               5
```

<210> SEQ ID NO 32

<400> SEQUENCE: 32

000

<210> SEQ ID NO 33
<211> LENGTH: 6
<212> TYPE: PRT
<213> ORGANISM: Artificial Sequence
<220> FEATURE:
<223> OTHER INFORMATION: CH2 Loop 4 Replacement Sequence

<400> SEQUENCE: 33

```
Arg Glu Glu Ala Tyr Gln
1               5
```

<210> SEQ ID NO 34
<211> LENGTH: 8
<212> TYPE: PRT
<213> ORGANISM: Artificial Sequence
<220> FEATURE:
<223> OTHER INFORMATION: CH2 Loop 4 Replacement Sequence

<400> SEQUENCE: 34

```
Arg Glu Glu Gln Tyr Ala Ser Asn
1               5
```

<210> SEQ ID NO 35
<211> LENGTH: 8
<212> TYPE: PRT
<213> ORGANISM: Artificial Sequence
<220> FEATURE:
<223> OTHER INFORMATION: CH2 Loop 4 Replacement Sequence

<400> SEQUENCE: 35

```
Arg Glu Glu Val Leu Gln Tyr Asn
1               5
```

<210> SEQ ID NO 36
<211> LENGTH: 6

```
<212> TYPE: PRT
<213> ORGANISM: Artificial Sequence
<220> FEATURE:
<223> OTHER INFORMATION: CH2 Loop 4 Replacement Sequence

<400> SEQUENCE: 36

Arg Leu Gln Tyr Ala Asn
1               5

<210> SEQ ID NO 37
<211> LENGTH: 6
<212> TYPE: PRT
<213> ORGANISM: Artificial Sequence
<220> FEATURE:
<223> OTHER INFORMATION: CH2 Loop 4 Replacement Sequence

<400> SEQUENCE: 37

Arg Leu Gln Gln Ala Asn
1               5

<210> SEQ ID NO 38
<211> LENGTH: 6
<212> TYPE: PRT
<213> ORGANISM: Artificial Sequence
<220> FEATURE:
<223> OTHER INFORMATION: CH2 Loop 4 Replacement Sequence

<400> SEQUENCE: 38

Arg Leu Gln Gln Tyr Ala
1               5

<210> SEQ ID NO 39
<211> LENGTH: 6
<212> TYPE: PRT
<213> ORGANISM: Artificial Sequence
<220> FEATURE:
<223> OTHER INFORMATION: CH2 Loop 4 Replacement Sequence

<400> SEQUENCE: 39

Val Leu Gln Tyr Ala Asn
1               5

<210> SEQ ID NO 40
<211> LENGTH: 6
<212> TYPE: PRT
<213> ORGANISM: Artificial Sequence
<220> FEATURE:
<223> OTHER INFORMATION: CH2 Loop 4 Replacement Sequence

<400> SEQUENCE: 40

Arg Glu Val Leu Gln Asn
1               5

<210> SEQ ID NO 41
<211> LENGTH: 7
<212> TYPE: PRT
<213> ORGANISM: Artificial Sequence
<220> FEATURE:
<223> OTHER INFORMATION: CH2 Loop 4 Replacement Sequence

<400> SEQUENCE: 41

Arg Glu Val Leu Gln Tyr Asn
1               5

<210> SEQ ID NO 42
<211> LENGTH: 6
<212> TYPE: PRT
```

```
<213> ORGANISM: Artificial Sequence
<220> FEATURE:
<223> OTHER INFORMATION: CH2 Loop 4 Replacement Sequence

<400> SEQUENCE: 42

Arg Glu Val Leu Gln Ala
1               5

<210> SEQ ID NO 43
<211> LENGTH: 6
<212> TYPE: PRT
<213> ORGANISM: Artificial Sequence
<220> FEATURE:
<223> OTHER INFORMATION: CH2 Loop 4 Replacement Sequence

<400> SEQUENCE: 43

Arg Glu Val Leu Gln Gln
1               5

<210> SEQ ID NO 44
<211> LENGTH: 10
<212> TYPE: PRT
<213> ORGANISM: Artificial Sequence
<220> FEATURE:
<223> OTHER INFORMATION: CH2 Loop 4 Replacement Sequence

<400> SEQUENCE: 44

Arg Glu Glu Ala Val Leu Gln Tyr Ala Asn
1               5                   10

<210> SEQ ID NO 45
<211> LENGTH: 9
<212> TYPE: PRT
<213> ORGANISM: Artificial Sequence
<220> FEATURE:
<223> OTHER INFORMATION: CH2 Loop 4 Replacement Sequence

<400> SEQUENCE: 45

Arg Glu Glu Ala Val Leu Gln Tyr Asn
1               5

<210> SEQ ID NO 46

<400> SEQUENCE: 46

000

<210> SEQ ID NO 47
<211> LENGTH: 6
<212> TYPE: PRT
<213> ORGANISM: Artificial Sequence
<220> FEATURE:
<223> OTHER INFORMATION: CH2 Loop 4 Replacement Sequence

<400> SEQUENCE: 47

Arg Glu Leu Gln Tyr Asn
1               5

<210> SEQ ID NO 48
<211> LENGTH: 7
<212> TYPE: PRT
<213> ORGANISM: Artificial Sequence
<220> FEATURE:
<223> OTHER INFORMATION: CH2 Loop 5 Replacement Sequence

<400> SEQUENCE: 48

Val Leu Gln Gly Lys Glu Tyr
```

```
<210> SEQ ID NO 49
<211> LENGTH: 8
<212> TYPE: PRT
<213> ORGANISM: Artificial Sequence
<220> FEATURE:
<223> OTHER INFORMATION: CH2 Loop 5 Replacement Sequence

<400> SEQUENCE: 49

Leu Val Leu Gln Gly Lys Glu Tyr
1               5

<210> SEQ ID NO 50
<211> LENGTH: 8
<212> TYPE: PRT
<213> ORGANISM: Artificial Sequence
<220> FEATURE:
<223> OTHER INFORMATION: CH2 Loop 5 Replacement Sequence

<400> SEQUENCE: 50

Leu Asn Gly Lys Val Leu Gln Tyr
1               5

<210> SEQ ID NO 51
<211> LENGTH: 4
<212> TYPE: PRT
<213> ORGANISM: Artificial Sequence
<220> FEATURE:
<223> OTHER INFORMATION: CH2 Loop 6 Replacement Sequence

<400> SEQUENCE: 51

Leu Gln Ala Pro
1

<210> SEQ ID NO 52
<211> LENGTH: 5
<212> TYPE: PRT
<213> ORGANISM: Artificial Sequence
<220> FEATURE:
<223> OTHER INFORMATION: CH2 Loop 6 Replacement Sequence

<400> SEQUENCE: 52

Val Leu Gln Ala Pro
1               5

<210> SEQ ID NO 53
<211> LENGTH: 6
<212> TYPE: PRT
<213> ORGANISM: Artificial Sequence
<220> FEATURE:
<223> OTHER INFORMATION: CH2 Loop 6 Replacement Sequence

<400> SEQUENCE: 53

Val Leu Gln Tyr Ala Pro
1               5

<210> SEQ ID NO 54
<211> LENGTH: 5
<212> TYPE: PRT
<213> ORGANISM: Artificial Sequence
<220> FEATURE:
<223> OTHER INFORMATION: CH3 Loop 1 Replacement Sequence

<400> SEQUENCE: 54

Glu Gln Tyr Ala Gln
1               5
```

<210> SEQ ID NO 55
<211> LENGTH: 9
<212> TYPE: PRT
<213> ORGANISM: Artificial Sequence
<220> FEATURE:
<223> OTHER INFORMATION: CH3 Loop 1 Replacement Sequence

<400> SEQUENCE: 55

Met Thr Lys Val Leu Gln Tyr Ala Ser
1               5

<210> SEQ ID NO 56
<211> LENGTH: 19
<212> TYPE: PRT
<213> ORGANISM: Artificial Sequence
<220> FEATURE:
<223> OTHER INFORMATION: CH3 Loop 2/3 Replacement Sequence

<400> SEQUENCE: 56

Val Leu Gln Tyr Ala Asn Asn Tyr Lys Thr Thr Pro Pro Val Leu Asp
1               5                   10                  15

Ser Asp Gly

<210> SEQ ID NO 57
<211> LENGTH: 22
<212> TYPE: PRT
<213> ORGANISM: Artificial Sequence
<220> FEATURE:
<223> OTHER INFORMATION: CH3 Loop 2/3 Replacement Sequence

<400> SEQUENCE: 57

Asn Val Leu Gln Gly Ser Pro Glu Asn Asn Tyr Lys Thr Thr Pro Pro
1               5                   10                  15

Val Leu Asp Ser Asp Gly
            20

<210> SEQ ID NO 58
<211> LENGTH: 22
<212> TYPE: PRT
<213> ORGANISM: Artificial Sequence
<220> FEATURE:
<223> OTHER INFORMATION: CH3 Loop 2/3 Replacement Sequence

<400> SEQUENCE: 58

Asn Val Leu Gln Tyr Ala Pro Glu Asn Asn Tyr Lys Thr Thr Pro Pro
1               5                   10                  15

Val Leu Asp Ser Asp Gly
            20

<210> SEQ ID NO 59
<211> LENGTH: 22
<212> TYPE: PRT
<213> ORGANISM: Artificial Sequence
<220> FEATURE:
<223> OTHER INFORMATION: CH3 Loop 2/3 Replacement Sequence

<400> SEQUENCE: 59

Asn Gly Gln Pro Glu Asn Val Leu Gln Tyr Ala Lys Thr Thr Pro Pro
1               5                   10                  15

Val Leu Asp Ser Asp Gly
            20

<210> SEQ ID NO 60

```
<211> LENGTH: 23
<212> TYPE: PRT
<213> ORGANISM: Artificial Sequence
<220> FEATURE:
<223> OTHER INFORMATION: CH3 Loop 2/3 Replacement Sequence

<400> SEQUENCE: 60

Asn Gly Gln Pro Glu Val Leu Gln Tyr Ala Asn Tyr Lys Thr Thr Pro
1               5                   10                  15

Pro Val Leu Asp Ser Asp Gly
            20

<210> SEQ ID NO 61
<211> LENGTH: 19
<212> TYPE: PRT
<213> ORGANISM: Artificial Sequence
<220> FEATURE:
<223> OTHER INFORMATION: CH3 Loop 2/3 Replacement Sequence

<400> SEQUENCE: 61

Asn Gly Gln Pro Glu Asn Asn Tyr Lys Thr Thr Pro Pro Val Leu Gln
1               5                   10                  15

Tyr Ala Gly

<210> SEQ ID NO 62
<211> LENGTH: 22
<212> TYPE: PRT
<213> ORGANISM: Artificial Sequence
<220> FEATURE:
<223> OTHER INFORMATION: CH3 Loop 2/3 Replacement Sequence

<400> SEQUENCE: 62

Asn Gly Gln Pro Glu Asn Asn Tyr Lys Thr Thr Pro Pro Val Leu Val
1               5                   10                  15

Leu Gln Tyr Ala Asp Gly
            20

<210> SEQ ID NO 63
<211> LENGTH: 23
<212> TYPE: PRT
<213> ORGANISM: Artificial Sequence
<220> FEATURE:
<223> OTHER INFORMATION: CH3 Loop 2/3 Replacement Sequence

<400> SEQUENCE: 63

Asn Gly Gln Pro Glu Asn Asn Tyr Lys Thr Thr Pro Pro Val Leu Asp
1               5                   10                  15

Ser Val Leu Gln Tyr Ala Gly
            20

<210> SEQ ID NO 64
<211> LENGTH: 19
<212> TYPE: PRT
<213> ORGANISM: Artificial Sequence
<220> FEATURE:
<223> OTHER INFORMATION: CH3 Loop 2/3 Replacement Sequence

<400> SEQUENCE: 64

Asn Gly Gln Pro Glu Asn Asn Tyr Lys Thr Thr Pro Val Leu Gln Tyr
1               5                   10                  15

Ala Ser Thr

<210> SEQ ID NO 65
<211> LENGTH: 9
```

```
<212> TYPE: PRT
<213> ORGANISM: Artificial Sequence
<220> FEATURE:
<223> OTHER INFORMATION: CH3 Loop 4 Replacement Sequence

<400> SEQUENCE: 65

Val Leu Gln Tyr Ala Arg Trp Asn Asn
1               5

<210> SEQ ID NO 66
<211> LENGTH: 10
<212> TYPE: PRT
<213> ORGANISM: Artificial Sequence
<220> FEATURE:
<223> OTHER INFORMATION: CH3 Loop 4 Replacement Sequence

<400> SEQUENCE: 66

Val Leu Gln Tyr Ala Ser Arg Trp Asn Asn
1               5                   10

<210> SEQ ID NO 67
<211> LENGTH: 10
<212> TYPE: PRT
<213> ORGANISM: Artificial Sequence
<220> FEATURE:
<223> OTHER INFORMATION: CH3 Loop 4 Replacement Sequence

<400> SEQUENCE: 67

Lys Ser Arg Trp Asn Val Leu Gln Tyr Ala
1               5                   10

<210> SEQ ID NO 68
<211> LENGTH: 10
<212> TYPE: PRT
<213> ORGANISM: Artificial Sequence
<220> FEATURE:
<223> OTHER INFORMATION: CH3 Loop 4 Replacement Sequence

<400> SEQUENCE: 68

Lys Ser Arg Gly Asn Val Leu Gln Tyr Ala
1               5                   10

<210> SEQ ID NO 69
<211> LENGTH: 6
<212> TYPE: PRT
<213> ORGANISM: Artificial Sequence
<220> FEATURE:
<223> OTHER INFORMATION: CH3 Loop 4 Replacement Sequence

<400> SEQUENCE: 69

Lys Ser Arg Val Leu Gln
1               5

<210> SEQ ID NO 70
<211> LENGTH: 9
<212> TYPE: PRT
<213> ORGANISM: Artificial Sequence
<220> FEATURE:
<223> OTHER INFORMATION: Kappa Loop 1 Replacement Sequence

<400> SEQUENCE: 70

Asp Glu Gln Leu Val Leu Gln Tyr Ala
1               5

<210> SEQ ID NO 71
<211> LENGTH: 10
<212> TYPE: PRT
```

<213> ORGANISM: Artificial Sequence
<220> FEATURE:
<223> OTHER INFORMATION: Kappa Loop 1 Replacement Sequence

<400> SEQUENCE: 71

```
<220> FEATURE:
<223> OTHER INFORMATION: Kappa Loop 3 Replacement Sequence

<400> SEQUENCE: 77

Asp Val Leu Gln Tyr Ala Asp
1               5

<210> SEQ ID NO 78
<211> LENGTH: 8
<212> TYPE: PRT
<213> ORGANISM: Artificial Sequence
<220> FEATURE:
<223> OTHER INFORMATION: Kappa Loop 3 Replacement Sequence

<400> SEQUENCE: 78

Asp Ser Val Leu Gln Tyr Ala Asp
1               5

<210> SEQ ID NO 79
<211> LENGTH: 8
<212> TYPE: PRT
<213> ORGANISM: Artificial Sequence
<220> FEATURE:
<223> OTHER INFORMATION: Kappa Loop 3 Replacement Sequence

<400> SEQUENCE: 79

Gly Ser Val Leu Gln Tyr Ala Gly
1               5

<210> SEQ ID NO 80

<400> SEQUENCE: 80

000

<210> SEQ ID NO 81
<211> LENGTH: 8
<212> TYPE: PRT
<213> ORGANISM: Artificial Sequence
<220> FEATURE:
<223> OTHER INFORMATION: Kappa Loop 3 Replacement Sequence

<400> SEQUENCE: 81

Asp Ser Val Leu Gln Tyr Lys Asp
1               5

<210> SEQ ID NO 82
<211> LENGTH: 7
<212> TYPE: PRT
<213> ORGANISM: Artificial Sequence
<220> FEATURE:
<223> OTHER INFORMATION: Kappa Loop 3 Replacement Sequence

<400> SEQUENCE: 82

Asp Ser Leu Gln Tyr Lys Asp
1               5

<210> SEQ ID NO 83
<211> LENGTH: 11
<212> TYPE: PRT
<213> ORGANISM: Artificial Sequence
<220> FEATURE:
<223> OTHER INFORMATION: Kappa Loop 4 Replacement Sequence

<400> SEQUENCE: 83

Ser Val Leu Gln Tyr Ala Asp Tyr Glu Lys His
1               5                   10
```

<210> SEQ ID NO 84
<211> LENGTH: 10
<212> TYPE: PRT
<213> ORGANISM: Artificial Sequence
<220> FEATURE:
<223> OTHER INFORMATION: Kappa Loop 4 Replacement Sequence

<400> SEQUENCE: 84

Val Leu Gln Tyr Ala Asp Tyr Glu Lys His
1               5                   10

<210> SEQ ID NO 85
<211> LENGTH: 12
<212> TYPE: PRT
<213> ORGANISM: Artificial Sequence
<220> FEATURE:
<223> OTHER INFORMATION: Kappa Loop 4 Replacement Sequence

<400> SEQUENCE: 85

Ser Gly Gly Val Leu Gln Tyr Ala Ser Gly Gly His
1               5                   10

<210> SEQ ID NO 86
<211> LENGTH: 12
<212> TYPE: PRT
<213> ORGANISM: Artificial Sequence
<220> FEATURE:
<223> OTHER INFORMATION: Kappa Loop 4 Replacement Sequence

<400> SEQUENCE: 86

Ser Lys Ala Asp Tyr Glu Val Leu Gln Tyr His Lys
1               5                   10

<210> SEQ ID NO 87
<211> LENGTH: 12
<212> TYPE: PRT
<213> ORGANISM: Artificial Sequence
<220> FEATURE:
<223> OTHER INFORMATION: Kappa Loop 4 Replacement Sequence

<400> SEQUENCE: 87

Ser Lys Ala Asp Tyr Glu Lys Val Leu Gln Tyr Lys
1               5                   10

<210> SEQ ID NO 88

<400> SEQUENCE: 88

000

<210> SEQ ID NO 89
<211> LENGTH: 6
<212> TYPE: PRT
<213> ORGANISM: Artificial Sequence
<220> FEATURE:
<223> OTHER INFORMATION: Kappa Loop 5 Replacement Sequence

<400> SEQUENCE: 89

Gln Gly Val Val Gln Tyr
1               5

<210> SEQ ID NO 90
<211> LENGTH: 6
<212> TYPE: PRT
<213> ORGANISM: Artificial Sequence
<220> FEATURE:

```
<223> OTHER INFORMATION: Kappa Loop 5 Replacement Sequence

<400> SEQUENCE: 90

Leu Gly Gln Tyr Ser Pro
1               5

<210> SEQ ID NO 91
<211> LENGTH: 7
<212> TYPE: PRT
<213> ORGANISM: Artificial Sequence
<220> FEATURE:
<223> OTHER INFORMATION: Kappa Loop 5 Replacement Sequence

<400> SEQUENCE: 91

Gln Gly Leu Gln Tyr Ser Pro
1               5

<210> SEQ ID NO 92
<211> LENGTH: 7
<212> TYPE: PRT
<213> ORGANISM: Artificial Sequence
<220> FEATURE:
<223> OTHER INFORMATION: Kappa Loop 5 Replacement Sequence

<400> SEQUENCE: 92

Gln Val Leu Gln Tyr Ser Pro
1               5

<210> SEQ ID NO 93
<211> LENGTH: 8
<212> TYPE: PRT
<213> ORGANISM: Artificial Sequence
<220> FEATURE:
<223> OTHER INFORMATION: Kappa Loop 5 Replacement Sequence

<400> SEQUENCE: 93

Gln Val Leu Gln Tyr Ala Ser Pro
1               5

<210> SEQ ID NO 94
<211> LENGTH: 7
<212> TYPE: PRT
<213> ORGANISM: Artificial Sequence
<220> FEATURE:
<223> OTHER INFORMATION: Kappa Loop 5 Replacement Sequence

<400> SEQUENCE: 94

Asn Val Leu Gln Tyr Ser Pro
1               5

<210> SEQ ID NO 95
<211> LENGTH: 7
<212> TYPE: PRT
<213> ORGANISM: Artificial Sequence
<220> FEATURE:
<223> OTHER INFORMATION: Kappa Loop 5 Replacement Sequence

<400> SEQUENCE: 95

Val Leu Gln Tyr Ala Ser Pro
1               5

<210> SEQ ID NO 96
<211> LENGTH: 8
<212> TYPE: PRT
<213> ORGANISM: Artificial Sequence
<220> FEATURE:
<223> OTHER INFORMATION: Kappa Loop 5 Replacement Sequence
```

<400> SEQUENCE: 96

Val Leu Gln Tyr Ala Ser Ser Pro
1               5

<210> SEQ ID NO 97

<400> SEQUENCE: 97

000

<210> SEQ ID NO 98
<211> LENGTH: 451
<212> TYPE: PRT
<213> ORGANISM: Homo sapiens
<220> FEATURE:
<221> NAME/KEY: MISC_FEATURE
<223> OTHER INFORMATION: Anti-mesothelin antibody heavy chain

<400> SEQUENCE: 98

Gln Val His Leu Val Glu Ser Gly Gly Val Gln Pro Gly Arg
1               5                   10                  15

Ser Leu Arg Leu Ser Cys Val Ala Ser Gly Ile Thr Phe Arg Ile Tyr
            20                  25                  30

Gly Met His Trp Val Arg Gln Ala Pro Gly Lys Gly Leu Glu Trp Val
        35                  40                  45

Ala Val Leu Trp Tyr Asp Gly Ser His Glu Tyr Tyr Ala Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Ile Tyr Tyr Cys
                85                  90                  95

Ala Arg Asp Gly Asp Tyr Tyr Asp Ser Gly Ser Pro Leu Asp Tyr Trp
            100                 105                 110

Gly Gln Gly Thr Leu Val Thr Val Ser Ser Ala Ser Thr Lys Gly Pro
        115                 120                 125

Ser Val Phe Pro Leu Ala Pro Ser Ser Lys Ser Thr Ser Gly Gly Thr
    130                 135                 140

Ala Ala Leu Gly Cys Leu Val Lys Asp Tyr Phe Pro Glu Pro Val Thr
145                 150                 155                 160

Val Ser Trp Asn Ser Gly Ala Leu Thr Ser Gly Val His Thr Phe Pro
                165                 170                 175

Ala Val Leu Gln Ser Ser Gly Leu Tyr Ser Leu Ser Ser Val Val Thr
            180                 185                 190

Val Pro Ser Ser Ser Leu Gly Thr Gln Thr Tyr Ile Cys Asn Val Asn
        195                 200                 205

His Lys Pro Ser Asn Thr Lys Val Asp Lys Arg Val Glu Pro Lys Ser
    210                 215                 220

Cys Asp Arg Thr His Thr Cys Pro Pro Cys Pro Ala Pro Glu Leu Leu
225                 230                 235                 240

Gly Gly Pro Ser Val Phe Leu Phe Pro Pro Lys Pro Lys Asp Thr Leu
                245                 250                 255

Met Ile Ser Arg Thr Pro Glu Val Thr Cys Val Val Val Asp Val Ser
            260                 265                 270

His Glu Asp Pro Glu Val Lys Phe Asn Trp Tyr Val Asp Gly Val Glu
        275                 280                 285

Val His Asn Ala Lys Thr Lys Pro Arg Glu Glu Gln Tyr Asn Ser Thr

```
                290                 295                 300
Tyr Arg Val Val Ser Val Leu Thr Val Leu His Gln Asp Trp Leu Asn
305                 310                 315                 320

Gly Lys Glu Tyr Lys Cys Lys Val Ser Asn Lys Ala Leu Pro Ala Pro
                325                 330                 335

Ile Glu Lys Thr Ile Ser Lys Ala Lys Gly Gln Pro Arg Glu Pro Gln
                340                 345                 350

Val Tyr Thr Leu Pro Pro Ser Arg Glu Glu Met Thr Lys Asn Gln Val
                355                 360                 365

Ser Leu Thr Cys Leu Val Lys Gly Phe Tyr Pro Ser Asp Ile Ala Val
                370                 375                 380

Glu Trp Glu Ser Asn Gly Gln Pro Glu Asn Asn Tyr Lys Thr Thr Pro
385                 390                 395                 400

Pro Val Leu Asp Ser Asp Gly Ser Phe Phe Leu Tyr Ser Lys Leu Thr
                405                 410                 415

Val Asp Lys Ser Arg Trp Gln Gln Gly Asn Val Phe Ser Cys Ser Val
                420                 425                 430

Met His Glu Ala Leu His Asn His Tyr Thr Gln Lys Ser Leu Ser Leu
                435                 440                 445

Ser Pro Gly
    450

<210> SEQ ID NO 99
<211> LENGTH: 214
<212> TYPE: PRT
<213> ORGANISM: Homo sapiens
<220> FEATURE:
<221> NAME/KEY: MISC_FEATURE
<223> OTHER INFORMATION: Anti-mesothelin antibody light chain

<400> SEQUENCE: 99

Glu Ile Val Leu Thr Gln Ser Pro Ala Thr Leu Ser Leu Ser Pro Gly
1               5                   10                  15

Glu Arg Ala Thr Leu Ser Cys Arg Ala Ser Gln Ser Val Ser Ser Tyr
                20                  25                  30

Leu Ala Trp Tyr Gln Gln Lys Pro Gly Gln Ala Pro Arg Leu Leu Ile
                35                  40                  45

Tyr Asp Ala Ser Asn Arg Ala Thr Gly Ile Pro Ala Arg Phe Ser Gly
    50                  55                  60

Ser Gly Ser Gly Thr Asp Phe Thr Leu Thr Ile Ser Ser Leu Glu Pro
65                  70                  75                  80

Glu Asp Phe Ala Val Tyr Tyr Cys Gln Gln Arg Ser Asn Trp Pro Leu
                85                  90                  95

Thr Phe Gly Gly Gly Thr Lys Val Glu Ile Lys Arg Thr Val Ala Ala
                100                 105                 110

Pro Ser Val Phe Ile Phe Pro Pro Ser Asp Glu Gln Leu Lys Ser Gly
                115                 120                 125

Thr Ala Ser Val Val Cys Leu Leu Asn Asn Phe Tyr Pro Arg Glu Ala
                130                 135                 140

Lys Val Gln Trp Lys Val Asp Asn Ala Leu Gln Ser Gly Asn Ser Gln
145                 150                 155                 160

Glu Ser Val Thr Glu Gln Asp Ser Lys Asp Ser Thr Tyr Ser Leu Ser
                165                 170                 175

Ser Thr Leu Thr Leu Ser Lys Ala Asp Tyr Glu Lys His Lys Val Tyr
                180                 185                 190
```

```
Ala Cys Glu Val Thr His Gln Gly Leu Ser Ser Pro Val Thr Lys Ser
        195                 200                 205
Phe Asn Arg Gly Glu Cys
    210

<210> SEQ ID NO 100
<211> LENGTH: 8
<212> TYPE: PRT
<213> ORGANISM: Artificial Sequence
<220> FEATURE:
<223> OTHER INFORMATION: CH2 Loop 4 Replacement Sequence

<400> SEQUENCE: 100

Arg Glu Glu Val Leu Gln Tyr Ala
1               5

<210> SEQ ID NO 101
<211> LENGTH: 6
<212> TYPE: PRT
<213> ORGANISM: Artificial Sequence
<220> FEATURE:
<223> OTHER INFORMATION: CH2 Loop 4 Replacement Sequence

<400> SEQUENCE: 101

Arg Glu Val Leu Gln Ala
1               5

<210> SEQ ID NO 102
<211> LENGTH: 10
<212> TYPE: PRT
<213> ORGANISM: Artificial Sequence
<220> FEATURE:
<223> OTHER INFORMATION: CH2 Loop 4 Replacement Sequence

<400> SEQUENCE: 102

Arg Glu Glu Ala Val Leu Gln Tyr Ala Ala
1               5                   10

<210> SEQ ID NO 103
<211> LENGTH: 9
<212> TYPE: PRT
<213> ORGANISM: Artificial Sequence
<220> FEATURE:
<223> OTHER INFORMATION: CH2 Loop 4 Replacement Sequence

<400> SEQUENCE: 103

Arg Glu Glu Ala Val Leu Gln Tyr Ala
1               5
```